(12) United States Patent
Iwamoto et al.

(10) Patent No.: US 10,372,989 B2
(45) Date of Patent: Aug. 6, 2019

(54) CONTROL APPARATUS AND CONTROL METHOD FOR DETERMINING RELATION OF PERSONS INCLUDED IN AN IMAGE, AND STORAGE MEDIUM STORING A PROGRAM THEREFOR

(71) Applicant: CANON KABUSHIKI KAISHA, Tokyo (JP)

(72) Inventors: Kazunari Iwamoto, Kawasaki (JP); Yoshitaka Nagao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 15/334,990

(22) Filed: Oct. 26, 2016

(65) Prior Publication Data
US 2017/0124387 A1    May 4, 2017

(30) Foreign Application Priority Data

Oct. 30, 2015  (JP) ................................. 2015-214925
Oct. 30, 2015  (JP) ................................. 2015-214935
Oct. 30, 2015  (JP) ................................. 2015-215053

(51) Int. Cl.
| | |
|---|---|
| *G06K 9/00* | (2006.01) |
| *G06K 9/46* | (2006.01) |
| *G06T 7/73* | (2017.01) |
| *G06T 11/60* | (2006.01) |
| *G08B 13/196* | (2006.01) |

(52) U.S. Cl.
CPC ..... *G06K 9/00677* (2013.01); *G06K 9/00268* (2013.01); *G06K 9/00288* (2013.01); *G06K 9/00295* (2013.01); *G06K 9/00335* (2013.01); *G06K 9/4652* (2013.01); *G06T 7/73* (2017.01); *G06T 11/60* (2013.01); *G08B 13/196* (2013.01); *G06K 9/00597* (2013.01); *G06T 2207/30232* (2013.01)

(58) Field of Classification Search
None
See application file for complete search history.

(56) References Cited

U.S. PATENT DOCUMENTS 9,210,313 B1 * 12/2015 Svendsen .......... G06F 17/30244
9,465,993 B2 * 10/2016 Krupka ............. G06F 17/30259
(Continued)

FOREIGN PATENT DOCUMENTS

| | | |
|---|---|---|
| JP | 2006-092396 A | 4/2006 |
| JP | 2014-199506 A | 10/2014 |
| JP | 2014192776 A | 10/2014 |

*Primary Examiner* — Kim Y Vu
*Assistant Examiner* — Nathan J Bloom
(74) *Attorney, Agent, or Firm* — Canon U.S.A., Inc. IP Division

(57) ABSTRACT

A control apparatus includes a detection unit, an association unit, and an output control unit. The detection unit detects a person from an image which includes a plurality of persons. The association unit associates the persons included in the image with each other based on at least one of a position of the person detected by the detection unit, directions of faces of the persons included in the image, and distances between the persons included in the image. The output control unit causes an output unit to output information that is indicative of a relation of the detected person with respect to other persons included in the image based on a result of association performed by the association unit.

21 Claims, 20 Drawing Sheets

(56) References Cited

U.S. PATENT DOCUMENTS

| | | | | |
|---|---|---|---|---|
| 2006/0061598 A1* | 3/2006 | Mino | ................ | G06K 9/00228 345/629 |
| 2008/0218595 A1* | 9/2008 | Kawahara | .......... | G06K 9/00228 348/222.1 |
| 2011/0150340 A1* | 6/2011 | Gotoh | ............... | G06F 17/30247 382/190 |
| 2011/0293148 A1* | 12/2011 | Kobayashi | ......... | G06K 9/00778 382/107 |
| 2013/0208124 A1* | 8/2013 | Boghossian | ........... | H04N 7/181 348/159 |
| 2014/0176749 A1* | 6/2014 | Horowitz | ........... | H04N 5/23222 348/222.1 |
| 2015/0015704 A1* | 1/2015 | Hirasawa | .............. | G06T 7/2093 348/143 |
| 2016/0119535 A1* | 4/2016 | Ohara | ................ | H04N 5/23219 348/222.1 |
| 2016/0267697 A1* | 9/2016 | Kato | .................... | G06K 9/6202 |
| 2017/0124722 A1* | 5/2017 | Inaguma | ................ | G06T 7/246 |

* cited by examiner

CONTROL APPARATUS AND CONTROL METHOD FOR DETERMINING RELATION OF PERSONS INCLUDED IN AN IMAGE, AND STORAGE MEDIUM STORING A PROGRAM THEREFOR

BACKGROUND OF THE INVENTION

Field of Invention

Aspects of the present invention generally relate to a control apparatus, a control method, and a storage medium for detecting a person from an image and causing a display device to perform display processing.

Description of Related Art

Image processing techniques for detecting a person from an image are well known. Japanese Patent Application Laid-Open No. 2014-199506 discusses a method for detecting a shielded person from an image.

The technique discussed in Japanese Patent Application Laid-Open No. 2014-199506 is able to indicate the position of a person in an image. For example, the technique is able to surround a person present in an image with a circle and to display the position of the person to a user. However, since this technique indicates only the position of a person, the user cannot determine at a glance whether the detected person is independently working in isolation from a group or is working collaboratively near the other persons. For example, in the case of a site in which data to be prevented from leakage is treated, a rule that prohibits working independently may be imposed, and a supervisor may observe workers via an imaging system and may want to call attention to a worker who is independently working in isolation from a group. Alternatively, in situations where a rule for working independently is enforced, for example, in a test taking environment, a supervisor observing a group of persons via the imaging system may desire to call attention to a person who is interacting with or observing other members of the group. However, only viewing a captured image is not enough for the supervisor to determine whether each person shown in the captured image is working independently or is working in collaboration with a plurality of persons existing in an image.

SUMMARY OF THE INVENTION

According to at least one embodiment disclosed herein, a control apparatus includes a detection unit configured to detect a person from an image which includes a plurality of persons, an association unit configured to associate the persons included in the image with each other based on at least one of a position of the person detected by the detection unit, directions of faces of the persons included in the image, and distances between the persons included in the image, and an output control unit configured to cause an output unit to output information that is indicative of a relation of the detected person with respect to other persons included in the image based on a result of association performed by the association unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

In a first exemplary embodiment, a description is made about processing for displaying to a user (a work observer, supervisor or manager) a notification indicating whether each worker shown in a captured image is an isolated worker (a person who is not associated with any other person) or a collaborative worker (a person who is associated with another person) at a site in which data to be prevented from leakage is treated and workers are required to work collaboratively in groups of two or more workers. Such a situation is an example of a situation to which the present exemplary embodiment is applicable, and the present exemplary embodiment is also applicable to various situations in which it is required to determine whether a person is present in isolation or a plurality of persons is present collectively. For example, the present invention can be applied to a situation in which determining whether, for example, passersby or visitors are alone or a group is utilized to solve a social issue or work task.

Figure 1:
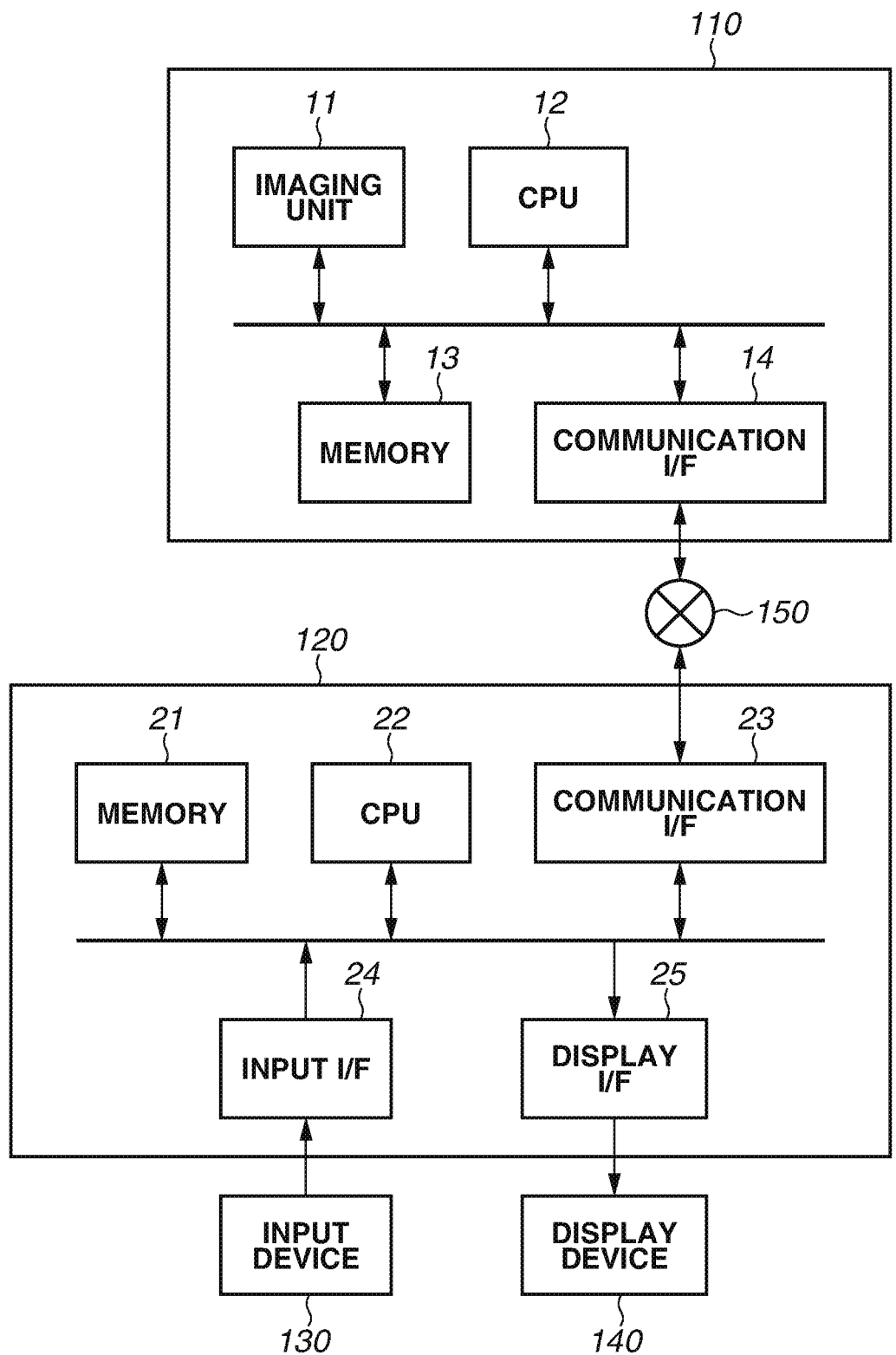
FIG. 1 illustrates examples of a system configuration and a hardware configuration of a system.

FIG. 1 illustrates examples of a system configuration and a hardware configuration of a system according to the present exemplary embodiment. Referring to FIG. 1, an imaging apparatus 110 performs image capturing. A client apparatus 120 drives the imaging apparatus 110, and displays a captured image, which is captured by the imaging apparatus 110. An input device 130, which includes, for example, a mouse and a keyboard, is used to input user instructions to the client apparatus 120. A display device 140, which includes, for example, a display, displays an image output from the client apparatus 120. While, in FIG. 1, the client apparatus 120 and the display device 140 are illustrated as respective independent apparatuses, the client apparatus 120 and the display device 140 can be configured into an integrated apparatus. Moreover, the input device 130 and the display device 140 can be configured into an integrated device, and the client apparatus 120, the input device 130, and the display device 140 can be configured into an integrated apparatus. A network 150 interconnects the imaging apparatus 110 and the client apparatus 120. The network 150 includes, for example, a plurality of routers, switches, and cables conforming to a communication standard, such as a local area network. In the present exemplary embodiment, the communication standard, scale, and configuration of the network 150 are not considered as long as it allows communication between the imaging apparatus 110 and the client apparatus 120. For example, the network 150 can include, for example, the Internet, a wired local area network (LAN), a wireless LAN, or a wide area network (WAN). Additionally, the number of imaging apparatuses connected to the client apparatus 120 is not limited to one, but can be plural.

A hardware configuration of the imaging apparatus 110 is described. The hardware configuration of the imaging apparatus 110 includes an imaging unit 11, a central processing unit (CPU) 12, a memory 13, and a communication interface (I/F) 14. The imaging unit 11 includes an image sensor and an optical system for an object, which is located on the image sensor, and performs image capturing on the image sensor with an intersection between the optical axis of the optical system and the image sensor as an imaging center under the control of the CPU 12. The image sensor is, for example, a complementary metal-oxide semiconductor (CMOS) sensor or a charge coupled device (CCD) sensor. The CPU 12 controls the entire imaging apparatus 110. The memory 13 stores programs, images captured by the imaging unit 11, and, for example, data used for the CPU 12 to perform processing. The communication I/F 14 controls communication with the client apparatus 120 via the network 150 under the control of the CPU 12. The functions of the imaging apparatus 110 are implemented by the CPU 12 performing processing based on the programs stored in the memory 13. Additionally, a processor other than the CPU 12 can be used.

A hardware configuration of the client apparatus 120 is described. The client apparatus 120 includes a memory 21, a CPU 22, a communication I/F 23, an input I/F 24, and a display I/F 25. The CPU 22 controls the entire client apparatus 120. The memory 21 stores programs, captured images sent from the imaging apparatus 110, and, for example, data used for the CPU 22 to perform processing. The communication I/F 23 controls communication with the imaging apparatus 110 via the network 150 based on the control of the CPU 22. The input I/F 24 interconnects the client apparatus 120 and the input device 130, and controls inputting of information from the input device 130. The display I/F 25 interconnects the client apparatus 120 and the display device 140, and controls outputting of information to the display device 140. The functions of the client apparatus 120 and processing operations in the flowchart of FIG. 3, which is described below, are implemented by the CPU 22 performing processing based on the programs stored in the memory 21. However, the hardware configuration of the client apparatus 120 is not limited to that illustrated in FIG. 1. For example, the client apparatus 120 can include an audio output device, such as a speaker, which is an example of a notification device. In a case where the client apparatus 120 includes an audio output device as a hardware configuration, an example of notification processing is processing for outputting a sound, such as an alarm.

Figure 2:
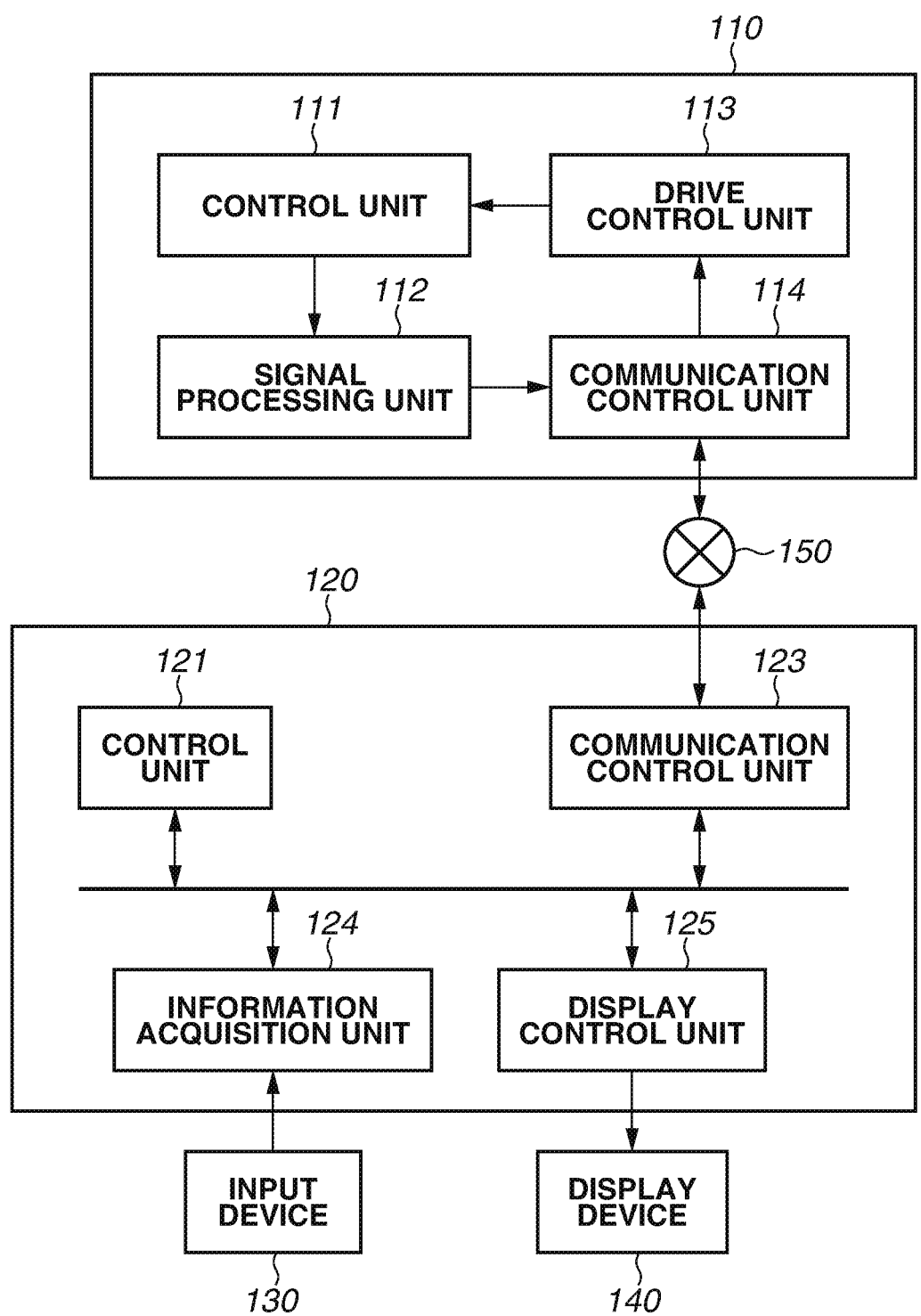
FIG. 2 illustrates examples of functional configurations of an imaging apparatus and a client apparatus.

FIG. 2 illustrates examples of functional configurations of the imaging apparatus 110 and the client apparatus 120. The functional configuration of the imaging apparatus 110 includes a control unit 111, a signal processing unit 112, a drive control unit 113, and a communication control unit 114. The control unit 111 controls the imaging apparatus 110. The signal processing unit 112 performs processing on an image signal obtained by image capturing by the imaging unit 11. For example, the signal processing unit 112 performs coding of an image captured by the imaging unit 11. The signal processing unit 112 is able to use, for example, Joint Photographic Experts Group (JPEG) as a coding method. Alternatively, the signal processing unit 112 is able to use H.264/MPEG-4 AVC (hereinafter referred to as "H.264") as a coding method. More alternatively, the signal processing unit 112 is able to use High Efficiency Video Coding (HEVC) as a coding method. However, the coding method is not limited to those. Additionally, the signal processing unit 112 can select a coding method from among a plurality of coding methods to perform coding.

The drive control unit 113 performs control to change the imaging direction and angle of view of the imaging unit 11. While, in the present exemplary embodiment, a case is described in which the imaging unit 11 is able to change the imaging direction in panning directions and tilting directions and to change the imaging angle of view, this is not limiting. The imaging apparatus 110 can be configured not to include the function of changing the imaging direction in panning directions and tilting directions, or not to include the function of changing the angle of view. The communication control unit 114 sends the captured image subjected to processing by the signal processing unit 112 to the client apparatus 120. Moreover, the communication control unit 114 receives a control instruction for the imaging apparatus 110 from the client apparatus 120.

The functional configuration of the client apparatus 120 includes a control unit 121, a communication control unit 123, an information acquisition unit 124, and a display control unit 125. The control unit 121 controls the client apparatus 120. The communication control unit 123 receives a captured image from the imaging apparatus 110. The information acquisition unit 124 receives user instructions input via the input device 130, and acquires input information from the input device 130. The display control unit 125 outputs a video to the display device 140, thus causing the display device 140 to perform display processing, which is described below. The display device 140 is an example of a notification device. Additionally, the display processing is an example of notification processing.

Figure 3:
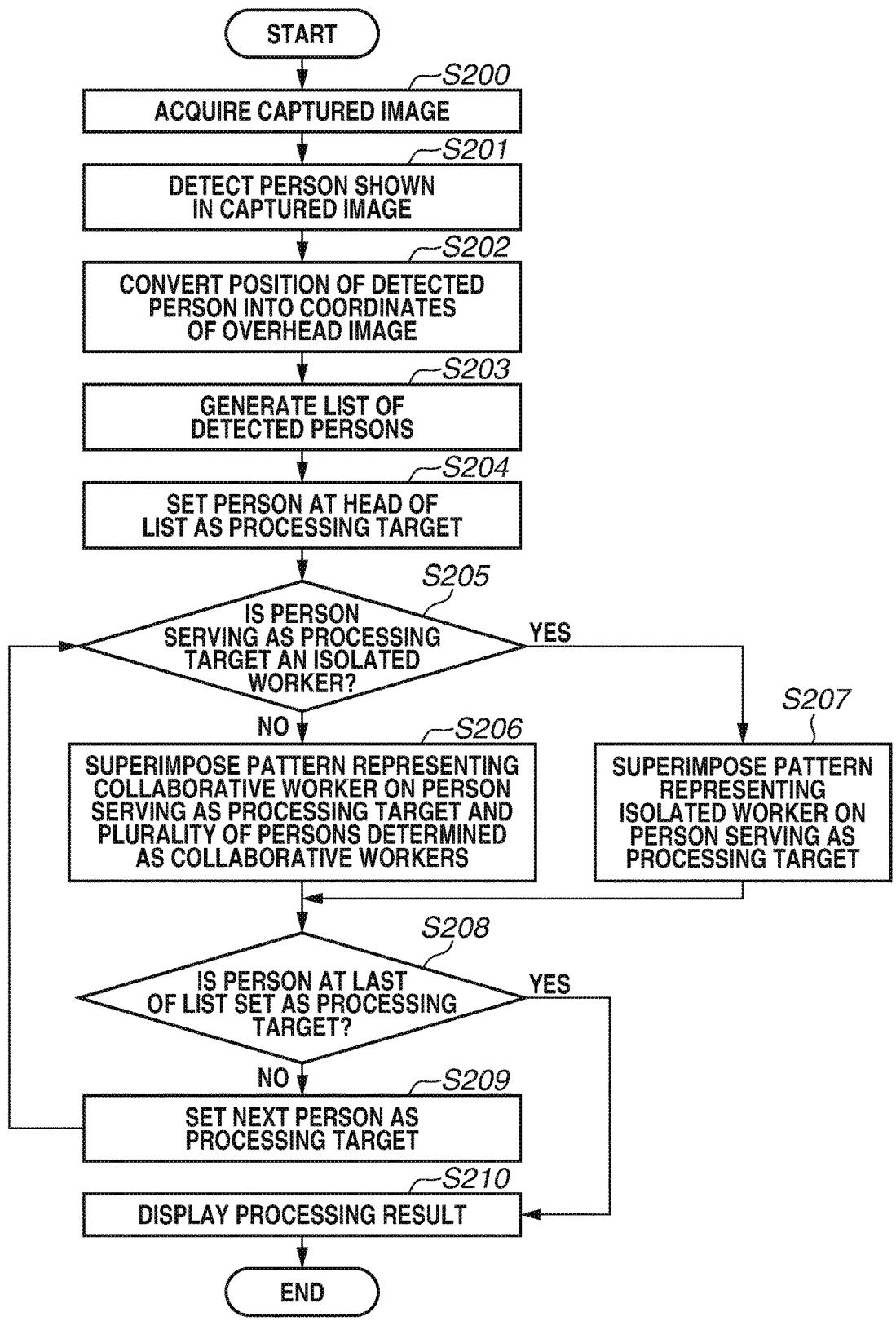
FIG. 3 is a flowchart illustrating an example of processing for display control.

Next, the flow of processing for display control in the present exemplary embodiment is described with reference to FIG. 3. FIG. 3 is a flowchart illustrating an example of processing for display control in the client apparatus 120. The client apparatus 120 acquires a captured image (or a moving image) from the imaging apparatus 110, superimposes a pattern for an isolated worker or a pattern for a collaborative worker on a worker shown in the acquired captured image, and displays the superimposed image on the display device 140.

Figure 4:
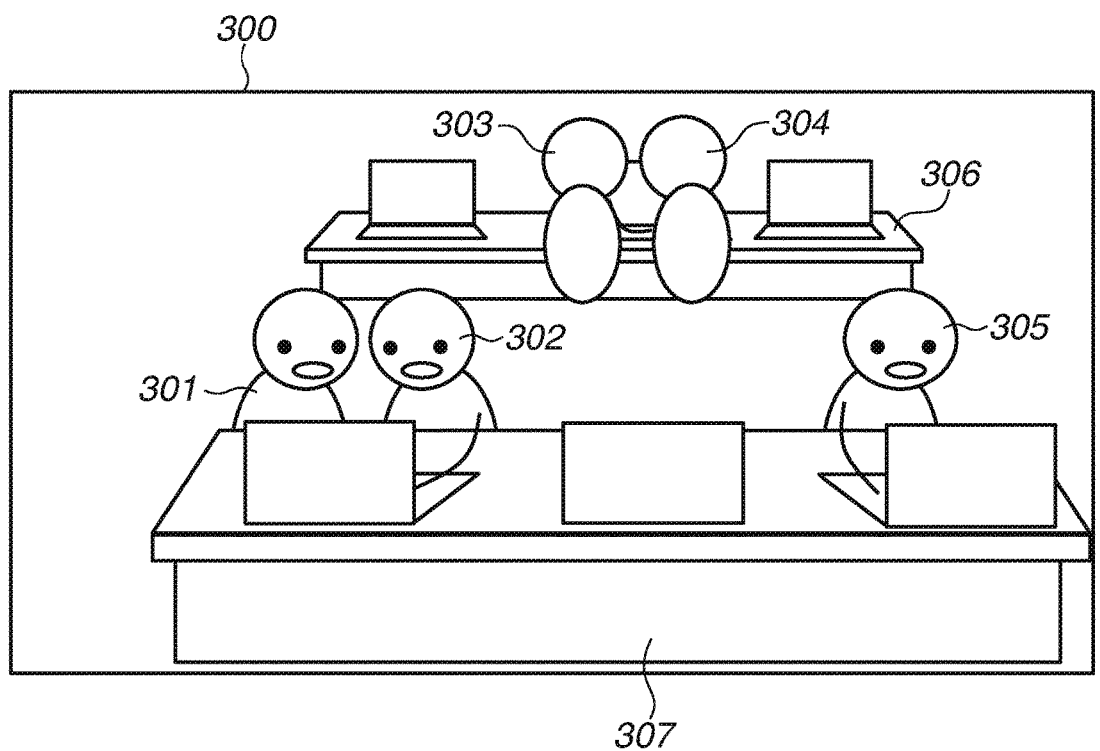
FIG. 4 illustrates an example of a captured image.

In step S200, the control unit 121 acquires a captured image from the imaging apparatus 110. FIG. 4 illustrates an example of a captured image 300 acquired by the client apparatus 120 from the imaging apparatus 110. In FIG. 4, workers 301 and 302 and workers 303 and 304 represent collaborative workers who are working in pairs. On the other hand, a worker 305 represents an isolated worker who is working alone. Moreover, a work table 306 represents a work table located far away from the imaging apparatus 110. A work table 307 represents a work table located near the imaging apparatus 110.

At this time, it is desirable that the position, mounting angle, and angle of view of the imaging unit 11 of the imaging apparatus 110 be adjusted in advance in such a manner that workers do not overlap as much as possible in a captured image acquired by the client apparatus 120. In the present exemplary embodiment, the client apparatus 120 performs processing on the captured image acquired from the imaging apparatus 110. With this, processing can be performed on a real-time live video. However, this is not limiting because image processing can also be performed in prerecorded video. For example, the client apparatus 120 can acquire a moving image stored in the imaging apparatus 110 and perform processing on each frame, or can perform processing on each frame of a moving image stored in the client apparatus 120. Alternatively, the client apparatus 120 can access, for example, a recording server and perform processing on each frame of a moving image stored in the recording server. Moreover, while, in the present exemplary embodiment, collaborative workers are paired, this is not limiting. The client apparatus 120 can set three or more workers as a group of collaborative workers.

Then, in step S201, the control unit 121 performs person detection processing on the captured image 300 acquired in step S200. To perform the person detection processing, in the present exemplary embodiment, the control unit 121 first performs scaling on the captured image 300 in various sizes. Performing scaling enables detecting persons of various sizes. Next, the control unit 121 performs raster scan on each scaled captured image using a detection window of a specified size. At this time, the control unit 121 previously calculates a feature amount of a person using learning data, and determines that the object is a person in a case where a difference between the feature amount calculated within the detection window during scan and the feature amount that is based on the learning data is smaller than a threshold value.

Figure 5A:
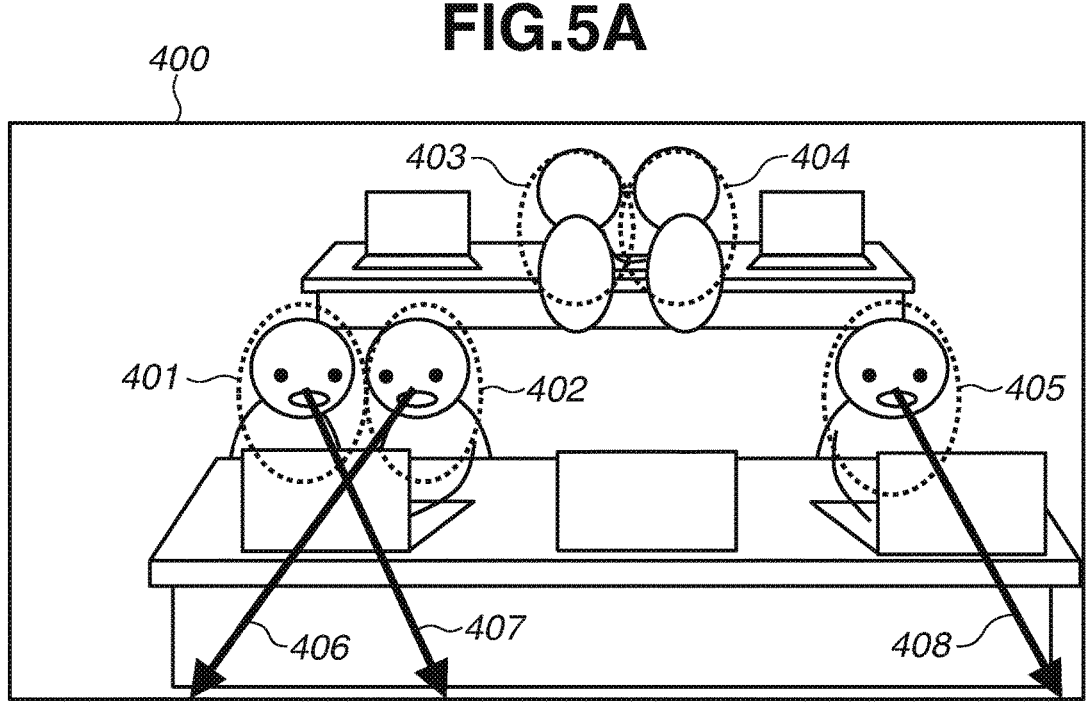
FIGS. 5A and 5B illustrate examples of images representing a result of person detection.
Figure 5B:
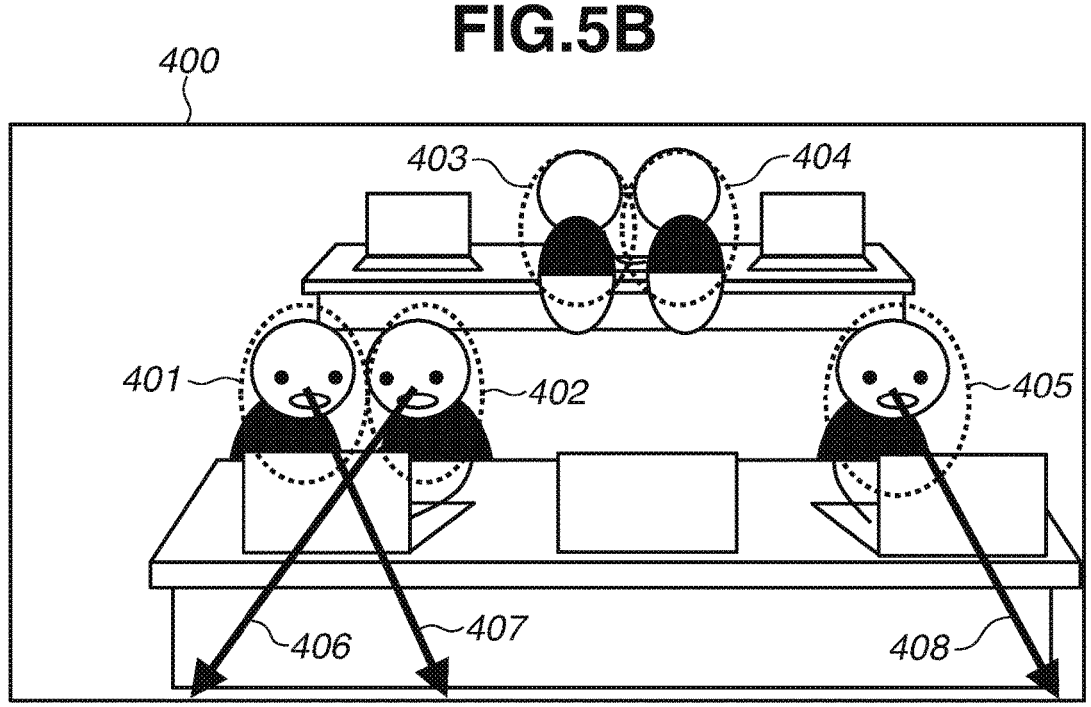

FIGS. 5A and 5B illustrate examples of images 400 representing a result of performing person detection on the captured image 300. In FIG. 5A, ellipses 401 to 405 represent positions where the workers 301 to 305 have been detected respectively. Furthermore, arrows 406 to 408, which are half lines with the arrow tail end serving as a base point and the arrow head extending infinitely, represent direction of faces of the respective persons. Furthermore, besides the above-described detection method using the feature amount of a person, for example, a rule that obliges workers to wear at least one of predetermined uniforms, bibs, and caps, as illustrated in FIG. 5B, can be determined. More specifically, the feature amount of a thing worn by a person to be detected as a worker can be stored in advance as a setting file for a rule in, for example, the memory 21 of the client apparatus 120. In doing so, the control unit 121 can detect a worker wearing, for example, a uniform matching the rule based on the rule in the setting file and the feature amount of, for example, color and shape of a thing worn by a person targeted for processing in the captured image.

Then, in step S202, the control unit 121 converts the position of the person detected in step S201 into coordinates on a horizontal plane image, which is obtained by projecting a shooting range of the captured image onto a horizontal plane from directly above. In the present exemplary embodiment, it is determined in advance which points on the horizontal plane image are associated with the respective points on the captured image. For example, the user specifies four points on the captured image displayed on, for example, the display device 140 and four points on the horizontal plane image by operating, for example, the input device 130. The control unit 121 calculates a homography matrix H in advance based on, for example, the four points on the captured image and the four points on the horizontal plane image, which are input by the user, and the following formulae (1) and (2):

$$H = \begin{bmatrix} h_{11} & h_{12} & h_{13} \\ h_{21} & h_{22} & h_{23} \\ h_{31} & h_{32} & 1 \end{bmatrix} \quad (1)$$

$$\begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} p_{x1} & p_{y1} & 1 & 0 & 0 & 0 & -p_{x1}q_{x1} & -p_{y1}q_{x1} \\ 0 & 0 & 0 & p_{x1} & p_{y1} & 1 & -p_{x1}q_{y1} & -p_{y1}q_{y1} \\ p_{x2} & p_{y2} & 1 & 0 & 0 & 0 & -p_{x2}q_{x2} & -p_{y2}q_{x2} \\ 0 & 0 & 0 & p_{x2} & p_{y2} & 1 & -p_{x2}q_{y2} & -p_{y2}q_{y2} \\ p_{x3} & p_{y3} & 1 & 0 & 0 & 0 & -p_{x3}q_{x3} & -p_{y3}q_{x3} \\ 0 & 0 & 0 & p_{x3} & p_{y3} & 1 & -p_{x3}q_{y3} & -p_{y3}q_{y3} \\ p_{x4} & p_{y4} & 1 & 0 & 0 & 0 & -p_{x4}q_{x4} & -p_{y4}q_{x4} \\ 0 & 0 & 0 & p_{x4} & p_{y4} & 1 & -p_{x4}q_{y4} & -p_{y4}q_{y4} \end{bmatrix}^{-1} \begin{bmatrix} q_{x1} \\ q_{y1} \\ q_{x2} \\ q_{y2} \\ q_{x3} \\ q_{y3} \\ q_{x4} \\ q_{y4} \end{bmatrix} \quad (2)$$

Here, px1, py1, ..., px4, py4 and qx1, qy1, ..., qx4, qy4 in formula (2) denote x and y coordinates of the four points on the captured image and x and y coordinates of the four points on the horizontal plane image, which are specified by the user.

Next, the control unit 121 applies the following formula (3) to the x coordinate px and the y coordinate py on the captured image and the homography matrix H, thus calculating the X coordinate qx and the Y coordinate qy on the horizontal plane image corresponding to the coordinates px and py.

$$\begin{bmatrix} sq_x \\ sq_y \\ s \end{bmatrix} = H \begin{bmatrix} p_x \\ p_y \\ 1 \end{bmatrix} \quad (3)$$

Figure 6:
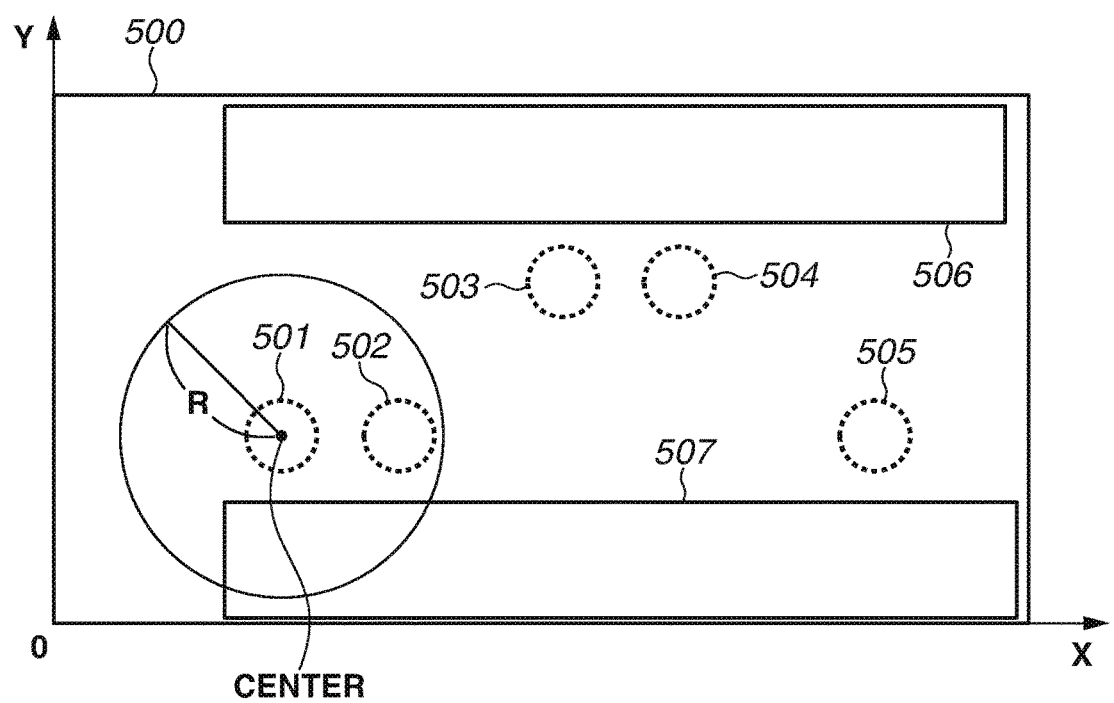
FIG. 6 illustrates an example of a horizontal plane (top view) image.

FIG. 6 illustrates an example of a horizontal plane image 500 at a work site. In FIG. 6, coordinates 501 to 505 represent a result of converting representative points of the ellipses 401 to 405, which are respective person detection positions, into coordinates on the horizontal plane image. In the present exemplary embodiment, the representative point is supposed to be the center of a person detection position as an example. The representative point can be the center of a region corresponding to the head of a person. Moreover, regions 506 and 507 represent regions obtained when the work tables 306 and 307 are expressed on the horizontal plane image, respectively. While, in the present exemplary embodiment, a sketch of the work site made by, for example, computer-aided design (CAD) is used as the horizontal plane image, this is not limiting. For example, an image obtained by deforming the captured image can also be used, or a handwritten image can also be used. Moreover, an image does not need to be prepared, and only information about the above-mentioned coordinates can be prepared inside a program. In other words, the horizontal plane image 500 does not need to be generated, and only calculating the coordinates on the horizontal plane image 500 can be performed. Furthermore, if image capturing is performed with a composition close to the horizontal plane image 500 (for example, an overhead view), processing in step S203 does not need to be necessarily performed. In this case, distances on the captured image can be used to determine whether the target worker is an isolated worker or a collaborative worker. Additionally, the method of generating the horizontal plane image 500 can include other various methods.

Next, in step S203, the control unit 121 generates a list of detected persons. At this time, the control unit 121 stores coordinates of representative points of the detected persons in the horizontal plane image at the respective nodes in the list.

Next, in steps S204 to S209, the control unit 121, while scanning the generated list, determines whether a person of interest is an isolated worker or a collaborative worker, and superimposes a pattern representing an isolated worker or a pattern representing a collaborative worker on every person shown in the captured image. The flow of processing is as follows.

(Processing 1). In step S204, the control unit 121 sets a person set forth at the head of the generated list as a processing target.

(Processing 2). In step S205, the control unit 121 determines whether a person of interest is an isolated worker.

In the present exemplary embodiment, the control unit 121 sets the coordinates of the person of interest on the horizontal plane image as the center, and determines whether a detected person is present within the radius R from the center. If a detected person is present within the radius R, the control unit 121 determines that the person of interest is a collaborative worker (NO in step S205), and then proceeds to (Processing 3-1) (step S206). On the other hand, if no detected person is present within the radius R, the control unit 121 determines that the person of interest is an isolated worker (YES in step S205), and then proceeds to (Processing 3-2) (step S207). In other words, in a case where a detected person is present within the radius R from the center corresponding to the coordinates of a person of interest on the horizontal plane image, the control unit 121 determines that the person of interest and the detected person are associated with each other and, thus, that the person of interest is a collaborative worker. In this way, the control unit 121 functions as an association unit. Moreover, the radius R is a predetermined setting value. The radius R can be set as appropriate according to a situation to which the present exemplary embodiment is applied. For example, in the case of observing an indoor work, the radius R can be set to a distance corresponding to 2 m.

(Processing 3-1). In step S206, the control unit 121 superimposes a pattern representing a collaborative worker on the person of interest and the person present within the radius R from the person of interest on the captured image and the horizontal plane image.

(Processing 3-2). In step S207, the control unit 121 superimposes a pattern representing an isolated worker on the person of interest on the captured image and the horizontal plane image.

(Processing 4). In step S208, the control unit 121 determines whether a person set forth at the last of the list is set as a processing target.

If a person set forth at the last of the list is not set as a processing target (NO in step S208), then in step S209, the control unit 121 sets the next person as a processing target, and then returns to (Processing 2) (step S205). On the other hand, if a person set forth at the last of the list is set as a processing target (YES in step S208), the control unit 121 ends processing for superimposing a pattern representing an isolated worker or a pattern representing a collaborative worker on every person, and then proceeds to step S210.

Here, processing for determining whether the person of interest is an isolated worker or a collaborative worker is not limited to the above-described processing. For example, the control unit 121 can be configured to associate persons with each other and determine that the associated person is a collaborative worker based on at least one of positions of persons detected from the captured image, directions of faces of the persons, and distances between the persons. For example, the control unit 121 can be configured to associate persons present within a predetermined range from a predetermined object, such as a work table, in the captured image with each other, or can be configured to estimate directions (or eye lines) of faces of persons and to associate persons the directions of faces of whom intersect with each other. Moreover, for example, the control unit 121 can be configured to associate persons the distance between whom is within a predetermined distance with each other. Then, the control unit 121 can be configured to determine that persons each of whom is associated with another person are collaborative workers and a person who is not associated with any other person is an isolated worker. Additionally, the control unit 121 can be further configured to associate persons with each other based on colors or shapes of uniforms, bibs (vest-like clothes), or caps of persons. For example, the control unit 121 can be configured to associate persons the shapes of uniforms of whom are the same among persons the distance between whom is within a predetermined distance with each other, and not to associate persons the shapes of uniforms of whom are different even among persons the distance between whom is within a predetermined distance with each other.

Figure 7:
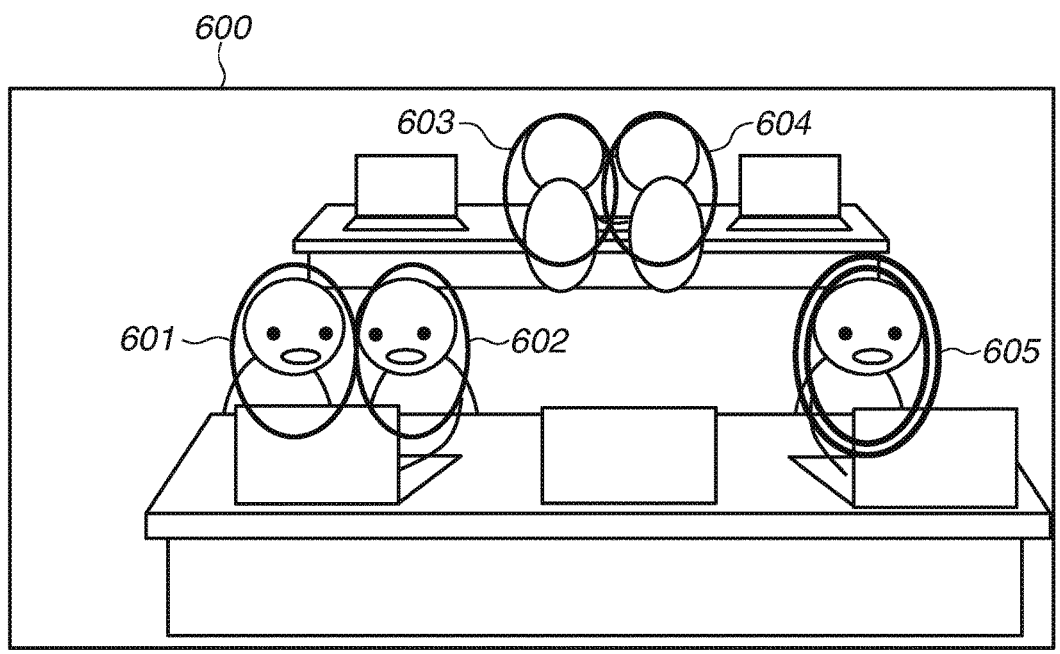
FIG. 7 illustrates an example of a captured image in which patterns are superimposed.

FIG. 7 illustrates an example of a captured image 600, which is obtained by applying the present system to the captured image 300 and in which patterns are superimposed. In FIG. 7, solid-line ellipses 601 to 604 indicate a pattern representing a collaborative worker, and a double-line ellipse 605 indicates a pattern representing an isolated worker.

In the present exemplary embodiment, a solid-line ellipse is used as a pattern representing a collaborative worker. Moreover, a double-line ellipse is used as a pattern representing an isolated worker. However, this is not limiting, and a collaborative worker and an isolated worker can be distinguished by colors of lines. Furthermore, each collaborative worker and each isolated worker can be surrounded with a solid-line ellipse, and ellipses serving as a pair of collaborative workers can be connected to each other by a line, or a group of persons serving as a pair of collaborative workers can be surrounded with a large circle. Additionally, workers can be connected to each other by a line without being surrounded with an ellipse.

Furthermore, groups of collaborative workers do not need to be assigned the same pattern, and, likewise, isolated workers do not need to be assigned the same pattern. Different patterns can be applied to respective groups of collaborative workers or respective isolated workers. For example, in the present exemplary embodiment, the control unit 121 can set the ellipses 601 and 602, which represent a collaborative worker, as a red ellipse, set the ellipses 603 and 604, which also represent a collaborative worker, as a blue ellipse, and set the ellipse 605, which represents an isolated worker, as a green ellipse.

Moreover, while, in the present exemplary embodiment, ellipses are used as patterns representing a collaborative worker and an isolated worker, this is not limiting. For example, a collaborative worker can be represented by a square, and an isolated worker can be represented by a triangle.

Furthermore, numerals or character strings for discriminating between an isolated worker and a collaborative worker can be appended. For example, the control unit 121 can superimpose a character string "isolated worker 1" on the vicinity of the position of a person determined to be an isolated worker on the captured image, and can surround a plurality of persons determined to be collaborative workers with a circle and superimpose a character string "collaborative workers 1" on the vicinity of the circle. In a case where a plurality of isolated workers or a plurality of groups of collaborative workers is present, the control unit 121 can superimpose character strings the numerals of ends of which are varied.

Additionally, if attention needs to be paid to only an isolated worker, the control unit 121 can be configured not to superimpose a pattern representing a collaborative worker, or can be configured to hide such a pattern even when superimposing the pattern.

Figure 8:
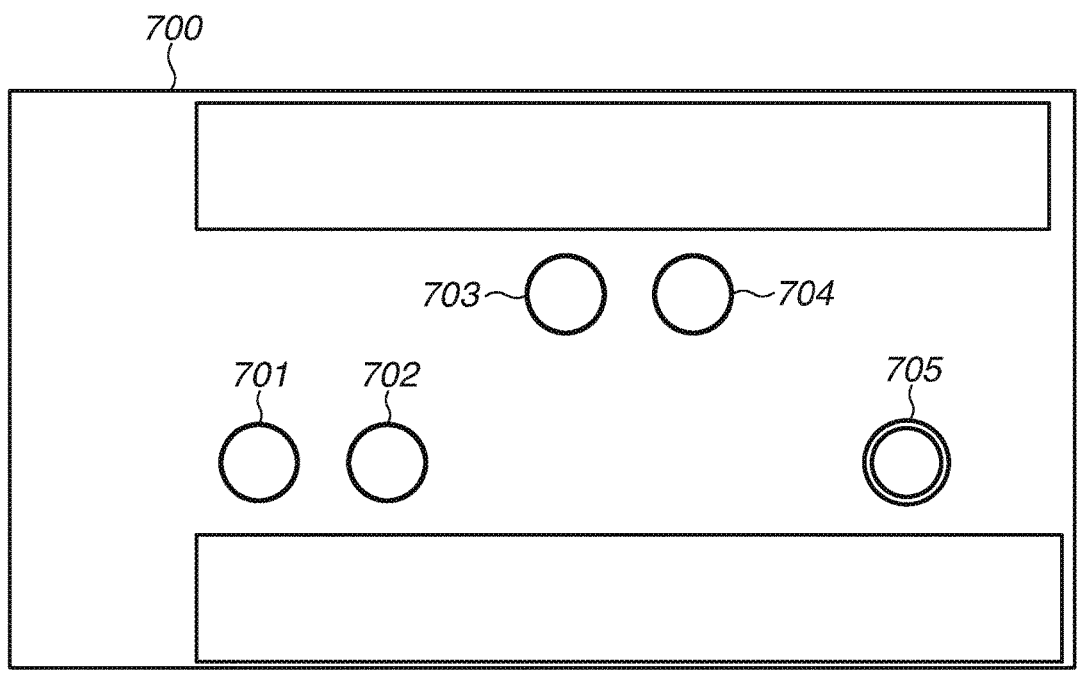
FIG. 8 illustrates an example of a horizontal plane (top view) image in which patterns are superimposed.

FIG. 8 illustrates an example of a horizontal plane image 700, which is obtained by applying the present system to the horizontal plane image 500 and in which patterns representing a collaborative worker and an isolated worker are superimposed. In FIG. 8, solid-line circles 701 to 704 indicate a pattern representing a collaborative worker, and a double-line circle 705 indicates a pattern representing an isolated worker. Even in a horizontal plane image, like a captured image, a pattern representing an isolated worker and a pattern representing a collaborative worker does not need to be distinguished by the types of lines. In other words, a pattern representing an isolated worker and a pattern representing a collaborative worker can be distinguished by colors, types of graphics, numerals, or character strings. Moreover, indexes representing workers (in FIG. 8, circles 701 to 704) can be connected to each other by a line.

Next, in step S210, the control unit 121 controls the display control unit 125 to cause the display device 140 to perform display processing for displaying a processing result obtained by superimposing patterns on the image. In the present exemplary embodiment, the captured image 600 and the horizontal plane image 700, in which a pattern representing an isolated worker and a pattern representing a collaborative worker are superimposed, are displayed on the display device 140.

However, this is not limiting, but the control unit 121 can cause the display device 140 to display only the captured image 600, in which the patterns are superimposed, or can cause the display device 140 to display only the horizontal plane image 700, in which the patterns are superimposed.

Furthermore, the control unit 121 can make an association between the captured image 600 and the horizontal plane image 700. For example, the control unit 121 can assign the same number to a person in the captured image 600 and a position obtained by coordinate conversion of the person on the horizontal plane image 700, or can append the same character string thereto. Additionally, the control unit 121 can perform control to allow the user to specify the position of a person in the horizontal plane image 700 using the input device 130 so as to highlight a pattern in the captured image 600 corresponding to the specified index. The method for highlighting a pattern includes, for example, thickening a line of the pattern and changing the color of the line.

Moreover, while, in the present exemplary embodiment, the control unit 121 performs control to generate images in which patterns are superimposed on the captured image 600 and the horizontal plane image 700 and to cause the display device 140 to display the generated images, this is not limiting. The control unit 121 can control the display control unit 125 to cause the display unit 140 to superimpose images of a pattern representing an isolated worker and a pattern representing a collaborative worker on the captured image 600 and the horizontal plane image 700 and to cause the display device 140 to display them.

Furthermore, while, in the present exemplary embodiment, an example has been described in which a single client apparatus detects, for example, persons and displays the persons, a plurality of client apparatuses can perform such processing. For example, processing can be performed by a first client apparatus, which receives a video, detects, for example, an isolated worker, and sends a notification thereof, and a second client apparatus, which receives the notification to output an alarm or to perform superimposition display. An example of the first client apparatus is a video content analysis (VCA) apparatus. An example of the second client apparatus is a video management system (VMS) apparatus. The hardware configuration of the first client apparatus and the second client apparatus is similar to that of the client apparatus 120 illustrated in FIG. 1. The functions of the respective client apparatuses are implemented by the CPUs of the respective client apparatuses performing processing based on programs stored in memories of the respective client apparatuses.

As described above, according to processing in the present exemplary embodiment, the client apparatus 120 is able to detect persons from an image and to associate the detected persons with each other based on at least one of positions of the persons, directions of faces of the persons, and distances between the persons. Then, the client apparatus 120 is able to cause a display device to perform display processing for enabling discriminating between a person who is associated with another person and a person who is not associated with any other person. As a result, information indicating whether a person shown in an image is isolated from or associated with another person can be appropriately presented.

In the first exemplary embodiment, for example, distances between coordinates on the horizontal plane image are used to determine whether a person is an isolated worker or a collaborative worker. Moreover, patterns representing an isolated worker or a collaborative worker are displayed on the captured image or the horizontal plane image. However, this is not limiting. In a second exemplary embodiment, a case is described in which detection areas are used to determine whether the target person is an isolated worker or a collaborative worker and to display patterns representing an isolated worker or a collaborative worker.

In the second exemplary embodiment, elements or steps similar to those of the first exemplary embodiment are omitted from the description, and elements or steps different from those of the first exemplary embodiment are mainly described.

In the present exemplary embodiment, in step S205, the control unit 121 determines whether a person of interest is an isolated worker using detection areas. For example, the control unit 121 sets a plurality of detection areas on the captured image and the horizontal plane image based on instructions input by the user via, for example, the input device 130. At this time, in step S205, in a case where another person is present within a detection area in which a person targeted for processing is present, the control unit 121 determines that the person targeted for processing is a collaborative worker. On the other hand, in a case where no other person is present within the detection area, the control unit 121 determines that the person targeted for processing is an isolated worker.

Then, the control unit 121 superimposes a pattern representing a collaborative worker on a detection area in which a collaborative worker is present, and superimposes a pattern representing an isolated worker on a detection area in which an isolated worker is present.

Figure 9:
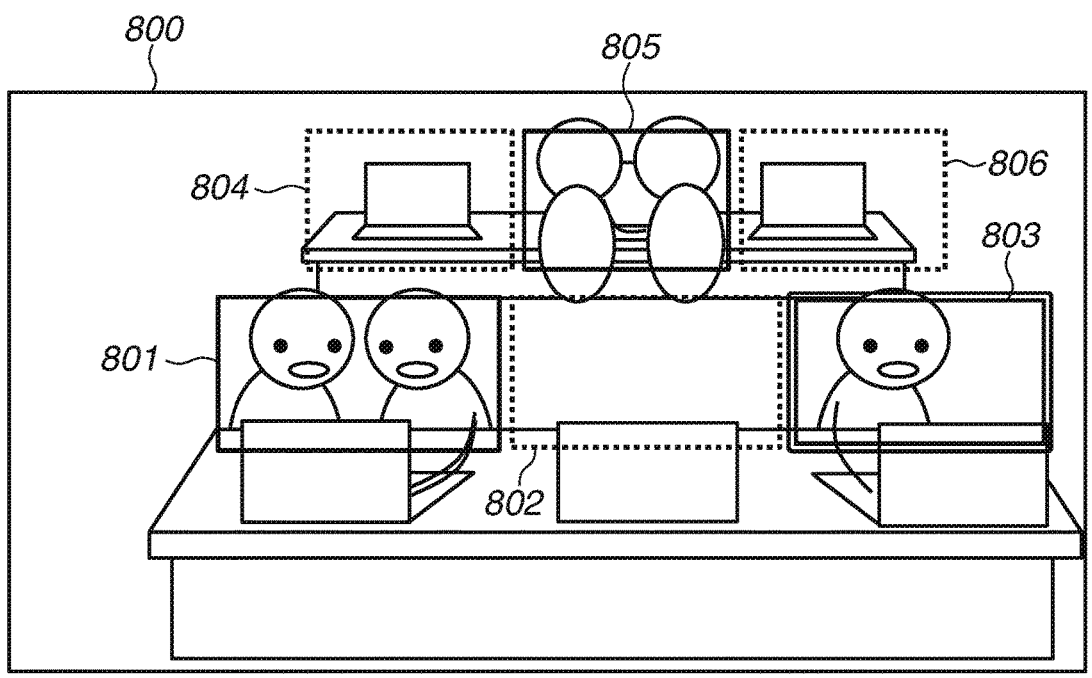
FIG. 9 illustrates an example of a captured image in which detection areas are set.
Figure 10:
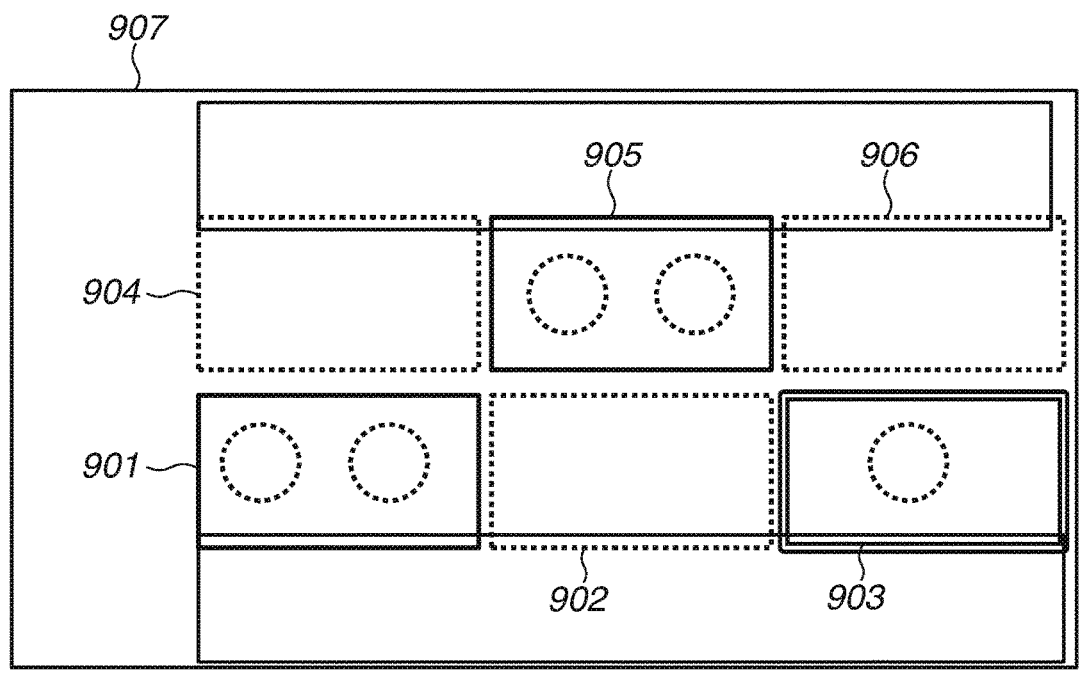
FIG. 10 illustrates an example of a horizontal plane (top view) image in which detection areas are set.

The above-described processing is described in detail with reference to FIGS. 9 and 10. FIG. 9 illustrates an example of a captured image 800 in which detection areas are set. Moreover, FIG. 10 illustrates an example of a horizontal plane image 900 in which detection areas are set. Detection areas 801 to 806 and 901 to 906 represent areas in which a group of collaborative workers may be present. In the examples illustrated in FIGS. 9 and 10, a plurality of persons is detected in each of the detection areas 801, 805, 901 and 905. At this time, if it is determined whether the target person is an isolated worker in the present exemplary embodiment, it is determined that the persons present in the detection areas 801, 805, 901 and 905 are collaborative workers. On the other hand, only one person is detected in each of the detection areas 803 and 903. At this time, if the control unit 121 in the present exemplary embodiment determines whether the target person is an isolated worker, the control unit 121 determines that the person present in the detection areas 803 and 903 is an isolated worker. Furthermore, as a result of the above determination, the control unit 121 controls the display device 140 to perform display processing in such a way as to express the boundaries of the detection areas 801, 805, 901 and 905 by solid lines and to express boundaries of the detection areas 803 and 903 by double lines. This enables expressing whether a person present in each detection area is an isolated worker or a collaborative worker.

While, in the present exemplary embodiment, changing the boundary of a detection area to a solid line or a double line is used to express whether a person present in each detection area is an isolated worker or a collaborative worker, this is not limiting. A pattern representing an isolated worker and a pattern representing a collaborative worker do not need to be distinguished by the types of lines. Those can be distinguished by colors, or can be distinguished by different graphics.

In the present exemplary embodiment, a description has been made using an example in which the control unit 121 sets detection areas. When detecting an isolated worker, the control unit 121 can be configured to superimpose a detection area in which the isolated worker has been detected on a video and to cause the display device 140 to display the video with the superimposed detection area. Moreover, the control unit 121 can be configured to first superimpose all detection areas on a video to display the video with the superimposed detection areas, and, when detecting an isolated worker, to display a detection area in which the isolated worker has been detected in such an explicit or highlighted manner as to change the color of the detection area to a color different from those of the other detection areas or to perform blinking display. This enables the work observer to understand, with good visibility, whether a person shown in a video is isolated from or associated with another person.

Furthermore, a clipped image, which is obtained by clipping an area corresponding to a person shown in the captured image, can be displayed. Then, a clipped image corresponding to an isolated worker and a clipped image corresponding to a collaborative worker can be displayed in a discriminable manner. For example, each clipped image can be surrounded with a frame and the colors of frames can be set in such a way as to vary between the clipped image corresponding to an isolated worker and the clipped image corresponding to a collaborative worker. If only an area corresponding to a person is clipped, observation becomes easy. Moreover, in a case where a plurality of imaging apparatuses is used, the image of a single person may be captured by the plurality of imaging apparatuses. In that case, such a configuration that only a captured image obtained by one of the imaging apparatuses is displayed can be employed, so that observation also becomes easy.

Next, a third exemplary embodiment is described with reference to FIG. 11. In the present exemplary embodiment, elements or steps similar to those of the other exemplary embodiments are omitted from the description as appropriate, and elements or steps different from those of the other exemplary embodiments are mainly described.

Figure 11:
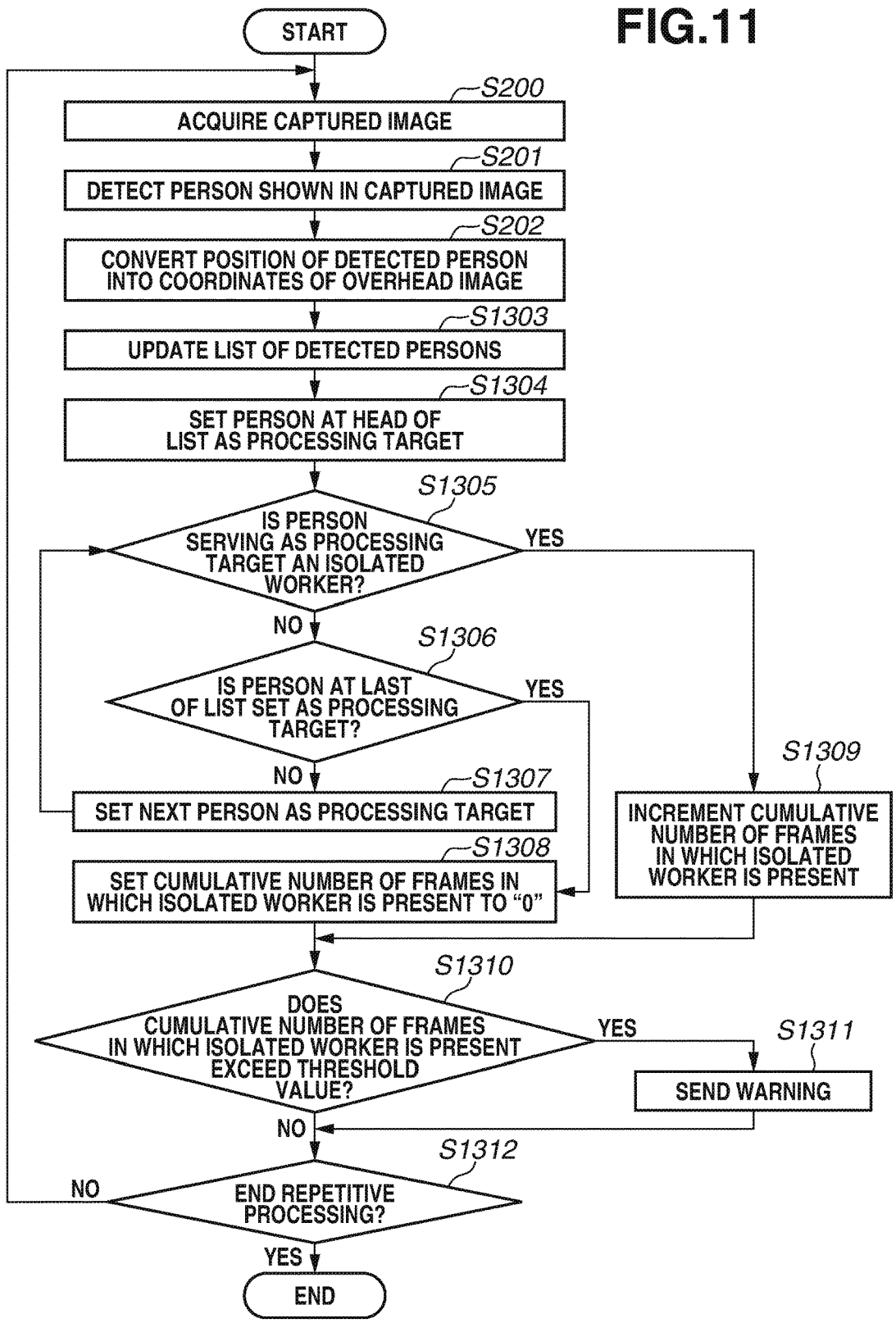
FIG. 11 is a flowchart illustrating an example of processing for notification control.

In the flowchart of FIG. 11, in step S1303, the control unit 121 updates a list of detected persons. In the case of the first cycle of repetitive processing, the control unit 121 lists all of the detected persons. At this time, the control unit 121 stores, in each node in the list, the coordinates of a representative point on the captured image at which a person has been detected and the coordinates of a representative point on the horizontal plane image at which the person has been detected. In the case of the second and subsequent cycles of repetitive processing, the control unit 121 performs the following processing on all of the detected persons.

(Processing 1). The control unit 121 calculates a distance between the coordinates on the captured image of a person stored in each node in the list and the coordinates on the captured image of itself, and, if the calculated distance is equal to or less than a threshold value, replaces a target node with data of itself. At this time, the control unit 121 stores a history of coordinates which have been stored in the nodes until now.

(Processing 2). If there is no node satisfying the condition in (Processing 1), the control unit 121 adds data of itself to the last of the list. Moreover, after completing the above processing on all of the detected persons, the control unit 121 performs the following processing.

(Processing 3). The control unit 121 deletes a node or nodes that have not been updated.

Next, in steps S1304 to S1306, the control unit 121 determines whether an isolated worker is present in the captured image. The flow of processing is as follows.

(Processing 1). In step S1304, the control unit 121 sets the head of the list as a processing target.

(Processing 2). In step S1305, the control unit 121 determines whether a person serving as a processing target is an isolated worker. In the present exemplary embodiment, the control unit 121 checks the following items with respect to the person serving as a processing target so as to determine whether that person is an isolated worker.

(Item 1). The control unit 121 sets the coordinates on the horizontal plane image of the person serving as a processing target as the center, and determines whether a detected person is present within the radius R from the center.

The radius R can be set as appropriate according to a situation to which the present exemplary embodiment is applied. For example, in the case of observing an indoor work, the radius R can be set to a distance corresponding to 2 m. However, at this time, the control unit 121 refers to a history of coordinates stored in the node of the person serving as a processing target, and sets the value of the radius R, which is a threshold value, larger when determining that the person serving as a processing target is in motion than when determining that the person serving as a processing target is not in motion. Furthermore, at this time, if collaborative workers are working side by side along the x-axis direction on the horizontal plane image, the control unit 121 can use an ellipse obtained by shortening a circle with the radius R in the y-axis direction. Similarly, if collaborative workers are working side by side along the y-axis direction on the horizontal plane image, the control unit 121 can use an ellipse obtained by shortening a circle with the radius R in the x-axis direction. The control unit 121 sets a person meeting the condition of (Item 1) as a candidate for a collaborative worker, and checks the following (Item 2) and (Item 3).

(Item 2). In a case where a person satisfying (Item 1) is present, the control unit 121 determines whether a half line indicating the direction of the face of that person intersects with a half line indicating the direction of the face of the person serving as a processing target.

However, at this time, if the direction of the face of that person has not been detected, the control unit 121 does not take (Item 2) in determining whether the person serving as a processing target is an isolated worker or a collaborative worker.

(Item 3). In a case where a person satisfying (Item 1) is present, the control unit 121 determines whether that person is present outside a non-detection area.

In the present exemplary embodiment, the control unit 121 sets an area specified by the user operating, for example, the input device 130 as a non-detection area, in which any person cannot be present. This enables preventing, for example, a non-worker who is moving on the opposite side of a glass-made wall or a person shown on, for example, a poster placed on a desk from being erroneously detected as a collaborative worker. Setting of the non-detection area is not limited to inputting by the user via, for example, the input device 130. The control unit 121 can automatically set an area surrounded with a marker laid on the captured image as a non-detection area. The method for detection using a marker includes, for example, performing pattern matching between two-dimensional markers set at the four corners of a non-detection area and information on the above two-dimensional markers previously registered with the client apparatus 120 by performing raster scanning on the captured image.

In a case where all of the above-mentioned (Item 1) to (Item 3) are satisfied, the control unit 121 determines that the person serving as a processing target is a collaborative worker (NO in step S1305), and then proceeds to (Processing 3-1) (S1306). In other words, the control unit 121 associates workers satisfying all of the above-mentioned (Item 1) to (Item 3) with each other and determines that the workers are collaborative workers. In this way, the control unit 121 functions as an association unit. Moreover, in a case where at least one of the above-mentioned (Item 1) to (Item 3) is not satisfied, the control unit 121 determines that the person serving as a processing target is an isolated worker (YES in step S1305), and then proceeds to (Processing 3-2) (step S1309).

Here, processing for determining whether the person serving as a processing target is an isolated worker or a collaborative worker is not limited to the above-described processing. For example, the control unit 121 can be configured to associate persons with each other and determine that the associated person is a collaborative worker based on at least one of a position of one or more persons detected from the captured image, directions of faces of the persons included in the image, and distances between the persons included in the image. For example, the control unit 121 can be configured to associate persons present within a predetermined range from a predetermined object, such as a work table, in the captured image with each other, or can be configured to estimate directions (or eye lines) of faces of persons and to associate persons the directions of faces of whom intersect with each other. Moreover, for example, the control unit 121 can be configured to associate persons the distance between whom is within a predetermined distance with each other. Then, the control unit 121 can be configured to determine that persons each of whom is associated with another person are collaborative workers and a person who is not associated with any other person is an isolated worker. Additionally, the control unit 121 can be further configured to associate persons with each other based on colors or shapes of uniforms, bibs (vest-like clothes), or caps of persons. For example, the control unit 121 can be configured to associate persons the shapes of uniforms of whom are the same among persons the distance between whom is within a predetermined distance with each other, and not to associate persons the shapes of uniforms of whom are different even among persons the distance between whom is within a predetermined distance with each other.

Figure 12:
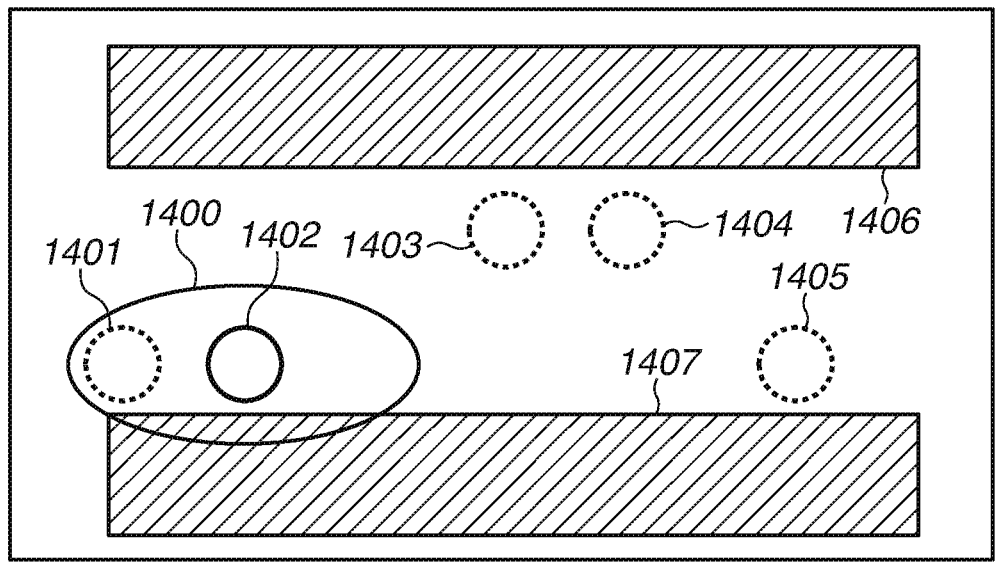
FIG. 12 is a top view diagram used to illustrate processing for determining whether a target person is an isolated from other persons existing in the image.

The determinations in the above-mentioned (Item 1) to (Item 3) are described with reference to FIG. 12. In FIG. 12, coordinates 1401 to 1405 represent results of converting the centers of the ellipses 401 to 405, which are person detection positions, into coordinates on the horizontal plane image. Moreover, regions 1406 and 1407 represent non-detection areas specified by the user. Additionally, an ellipse 1400 represents an ellipse defined by points x and y satisfying the following formula (4):

$$\frac{(x-qx)^2}{a^2} + \frac{(y-qy)^2}{b^2} = R^2 \qquad (4)$$

In formula (4), qx and qy denote the x coordinate and y coordinate, respectively, on the horizontal plane image of a person serving as a processing target. In FIG. 12, qx and qy represent the x coordinate and y coordinate, respectively, of the coordinates of a circle 1402. In formula (4), a and b denote transformation parameters for an ellipse. For example, when a=1 and b=1, the ellipse becomes a circle with a radius of R and a center of (qx, qy). Moreover, when a=1 and b=½, the ellipse becomes an ellipse with a length of R in the x-axis direction and a length of R/2 in the y-axis direction. In the present exemplary embodiment, since collaborative workers are working side by side along the x-axis direction on the horizontal plane image, the values of the transformation parameters are set to a relationship of "a>b".

For example, suppose that the control unit 121 sets a person in the ellipse 402, which is a person detection position, as a processing target during scanning of the list. At this time, the control unit 121 performs determinations in the above-mentioned (Item 1) to (Item 3) with respect to coordinates of circle 1402 on the horizontal plane image corresponding to the ellipse 402 of FIG. 5, which is a person detection position.

First, in (Item 1), the control unit 121 determines whether a detected person is present inside the ellipse 1400. In the situation illustrated in FIG. 12, since the coordinates 1401 on the horizontal plane image corresponding to the ellipse 401 for person detection are included in the ellipse 1400, the control unit 121 determines that the required condition is satisfied.

Next, in (Item 2), the control unit 121 determines whether a half line (arrow) 406 representing the direction of the face of the ellipse 402, which is a person detection position, and an arrow 407 representing the direction of the face of the ellipse 401, which is a person detection position of a person causing satisfaction of the condition of (Item 1), intersect. In the situation described in the present exemplary embodiment, since the arrows 406 and 407 intersect, the control unit 121 determines that the required condition is satisfied.

Next, in (Item 3), the control unit 121 determines whether the coordinates 1401 on the horizontal plane image corresponding to the ellipse 401, which is a person detection position of a person causing satisfaction of the condition of (Item 1), are not included in any of the areas 1406 and 1407, which are non-detection areas. In the situation described in the present exemplary embodiment, since the coordinates 1401 are not included in any of the areas 1406 and 1407, which are non-detection areas, the control unit 121 determines that the required condition is satisfied. Thus, since all of the requirements in (Item 1) to (Item 3) are satisfied, the control unit 121 determines that the person in the ellipse 402, which is a person detection position, is a collaborative worker.

Furthermore, in the present exemplary embodiment, the control unit 121 sets a person satisfying the condition of (Item 1) as a candidate for a collaborative worker. However, this is not limiting, but the control unit 121 can perform determination based on specifying of areas. For example, the control unit 121 sets a plurality of areas in which a pair of workers may be present on the captured image or the horizontal plane image based on instructions input by the user. At this time, the control unit 121 can set the condition of (Item 1) to whether a person is present in the same detection area as that of a person of interest.

(Processing 3-1). In step S1306, the control unit 121 determines whether the last of the list is set as a processing target.

If the processing target is not the last of the list (NO in step S1306), then in step S1307, the control unit 121 sets a next person as a processing target, and then returns to (Processing 2). If the processing target is the last of the list (YES in step S1306), the control unit 121 ends scanning on the list, and then in step S1308, sets the cumulative number of frames in which an isolated worker is present to "0".

(Processing 3-2). In step S1309, the control unit 121 increments the cumulative number of frames in which an isolated worker is present, in other words, increases the value of a variable by one.

Next, in steps S1310 and S1311, the control unit 121 determines whether to notify the user that an isolated worker is present, and, if that condition is satisfied, sends a notification to that effect. In the present exemplary embodiment, in a case where the cumulative number of frames (cumulative period) in which an isolated worker is present exceeds a threshold value, the control unit 121 sends a warning to the user. Using this determination condition enables preventing, for example, erroneously notifying the user that the person serving as a processing target is an isolated worker due to a momentary failure of person detection despite being a collaborative worker. Moreover, the control unit 121 can be configured to send a warning to the user when a period in which an isolated worker is present exceeds a threshold value instead of making a determination based on the cumulative number of frames. The control unit 121 can send a warning to the user in a case where a period (the cumulative number of frames or time) in which an isolated worker is present exceeds a threshold value. Furthermore, the control unit 121 can send a warning to the user in a case where a period (continuous period) for which a state in which an isolated worker is present continues exceeds a predetermined threshold value. Here, the threshold value is stored in, for example, the memory 21. The control unit 121 is able to change the threshold value according to a setting operation performed by the user via, for example, the input device 130. Additionally, the threshold value can be set to "0". Thus, in a case where an isolated worker is present, the user can be immediately notified.

Furthermore, in the present exemplary embodiment, the method for notifying the user that an isolated worker is present is described using, as an example, a method of displaying, on the display device 140, a user interface (UI) indicating that an isolated worker is present. For example, the control unit 121 causes the display device 140 via the display control unit 125 to perform display processing, such as superimposing a double-line circle or superimposing a red circle at the position of an isolated worker on the captured image 300 or the horizontal plane image 500. However, this is not limiting, but the control unit 121 can, for example, send an e-mail to the user or can issue an alert from a speaker. Additionally, the control unit 121 can issue a notification by turning on a light emission unit, such as a light-emitting diode (LED).

Next, in step S1312, the control unit 121 determines whether to repeat processing from acquisition of a captured image (step S200) to determination of whether to notify the user of the presence or absence of an isolated worker (steps S1310 and S1311). In the present exemplary embodiment, the control unit 121 determines to end repetitive processing in a case where the acquisition of a captured image from the imaging apparatus 110 has become impossible or in a case where an instruction for stopping the repetitive processing has been issued by the user.

As described above, if, in a moving image, there is a period of a moving image in which an isolated worker, who is not associated with any other person, is present, notification processing is performed according to such a period. This enables informing an observer that an isolated worker is present.

In the present exemplary embodiment, a description has been made mainly using an example in which the control unit 121 sets detection areas. When detecting an isolated worker, the control unit 121 can be configured to superimpose a detection area in which the isolated worker has been detected on a video and to cause the display device 140 to display the video with the superimposed detection area. Moreover, the control unit 121 can be configured to first superimpose all detection areas on a video to display the video with the superimposed detection areas, and, when detecting an isolated worker, to display a detection area in which the isolated worker has been detected in such an explicit or highlighted manner as to change the color of the detection area to a color different from other detection areas or to perform blinking display. This enables the work observer to understand, with good visibility, whether a person shown in a video is isolated from or associated with another person.

Furthermore, while, in the present exemplary embodiment, an example has been described in which a single client apparatus detects, for example, persons and displays such persons, a plurality of client apparatuses can perform such processing. For example, processing can be performed by a first client apparatus, which receives a video, detects, for example, an isolated worker, and sends a notification thereof, and a second client apparatus, which receives the notification to output an alarm or to perform superimposition display. An example of the first client apparatus is a video content analysis (VCA) apparatus. An example of the second client apparatus is a video management system (VMS) apparatus. The hardware configuration of the first client apparatus and the second client apparatus is similar to that of the client apparatus 120 illustrated in FIG. 1. The functions of the respective client apparatuses are implemented by the CPUs of the respective client apparatuses performing processing based on programs stored in memories of the respective client apparatuses.

When receiving a warning indicating that an isolated worker is present at a work site, the work observer can find a worker breaking a rule and thus can call attention to the worker.

Figure 13:
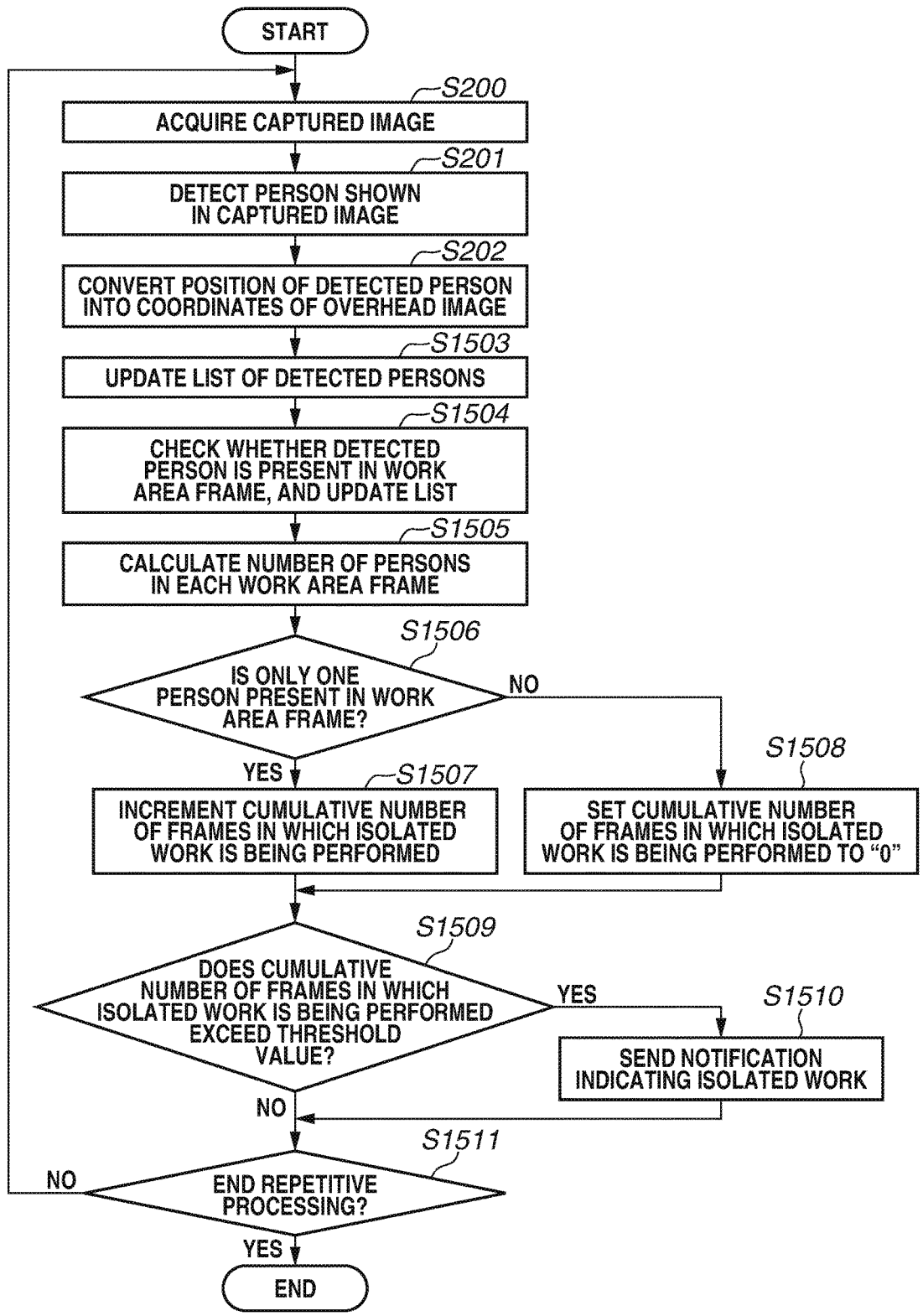
FIG. 13 is a flowchart illustrating an example of processing for notification control.

Next, a fourth exemplary embodiment is described with reference to FIG. 13. In the present exemplary embodiment, elements or steps similar to those of the other exemplary embodiments are omitted from the description as appropriate, and elements or steps different from those of the other exemplary embodiments are mainly described.

In step S1503, the control unit 121 updates a list of detected persons. In the case of the first cycle of repetitive processing, the control unit 121 lists all of the detected persons. At this time, the control unit 121 stores, in each node in the list, the coordinates of a representative point on the captured image at which a person has been detected and the coordinates of a representative point on the horizontal plane image at which the person has been detected. In the case of the second and subsequent cycles of repetitive processing, the control unit 121 performs the following processing on all of the detected persons.

(Processing 1). The control unit 121 calculates a distance between the coordinates on the captured image of a person stored in each node in the list and the coordinates on the captured image of itself, and, if the calculated distance is equal to or less than a threshold value, replaces a target node with data of itself. At this time, the control unit 121 stores a history of coordinates which have been stored in the nodes until now.

(Processing 2). If there is no node satisfying the condition in (Processing 1), the control unit 121 adds data of itself to the last of the list.

Moreover, after completing the above processing on all of the detected persons, the control unit 121 performs the following processing.

(Processing 3). The control unit 121 deletes a node or nodes that have not been updated.

Figure 14A:
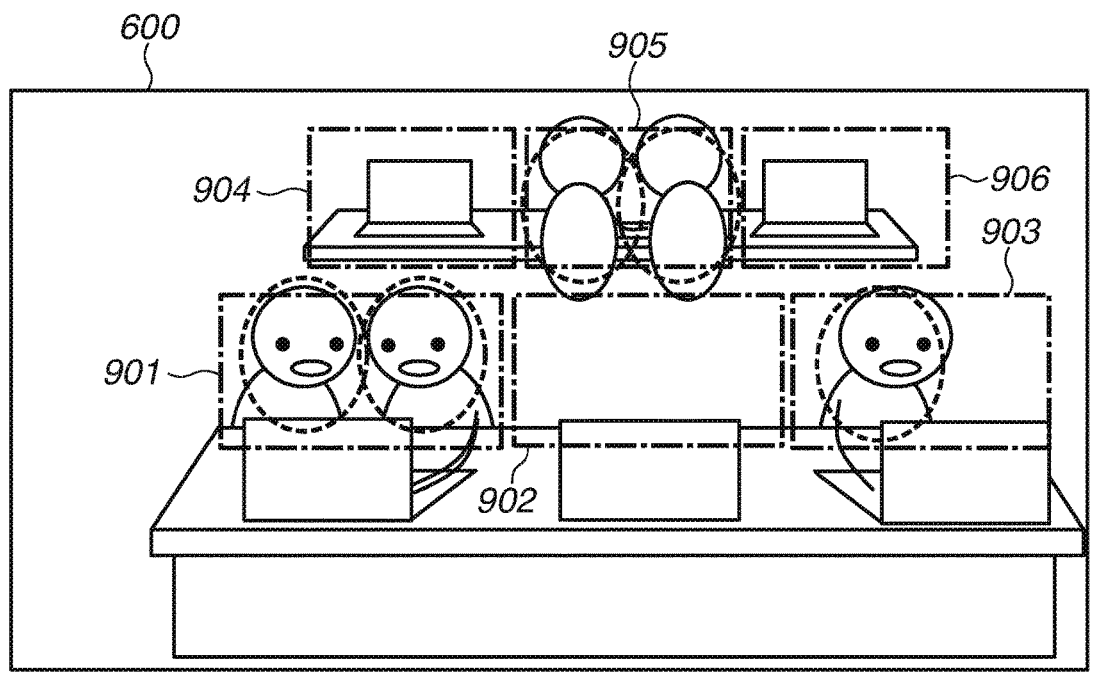
FIGS. 14A and 14B illustrate examples of work area frames.

Next, in steps S1504 to S1506, the control unit 121 determines whether an isolated worker is present in the captured image. In the present exemplary embodiment, as illustrated in FIG. 14A, the control unit 121 sets work area frames (901 to 906) in a captured image display based on, for example, a user operation. The flow of processing is as follows.

(Processing 4). In step S1504, the control unit 121 checks whether the coordinates of a person set as a processing target in order from the head of the list are present in a work area frame, and, if the coordinates of the person are present in the work area frame, stores, in the list, a flag indicating that the coordinates of the person are present in the work area frame. At this time, if there is a plurality of work areas, the control unit 121 stores, in the list, identification (ID) numbers which are assigned for the respective work area frames in a non-overlapping way.

(Processing 5). In step S1505, the control unit 121 searches the list and checks how many workers belonging to the area of each work area frame are present. In a case where only one worker is present in a work area frame (YES in step S1506), the control unit 121 determines that an isolated work is being performed in the work area frame, and, in the other cases (NO in step S1506), the control unit 121 determines that no isolated work is being performed in the work area frame. In other words, in a case where only one worker is present in a work area frame, the control unit 121 determines that the worker present in the corresponding area is an isolated worker, who is not associated with any other person. In a case where two or more workers are present in a work area frame, the control unit 121 associates the workers present in the corresponding area with each other and determines that those workers are collaborative workers. In this way, the control unit 121 functions as an association unit.

While, in the present exemplary embodiment, the control unit 121 first determines whether a worker is present in a work area frame based on a list of detected persons, the control unit 121 can check whether each person is present in a work area frame based on each work area frame and make such a determination based on only the number of persons present in each work area.

Figure 14B:
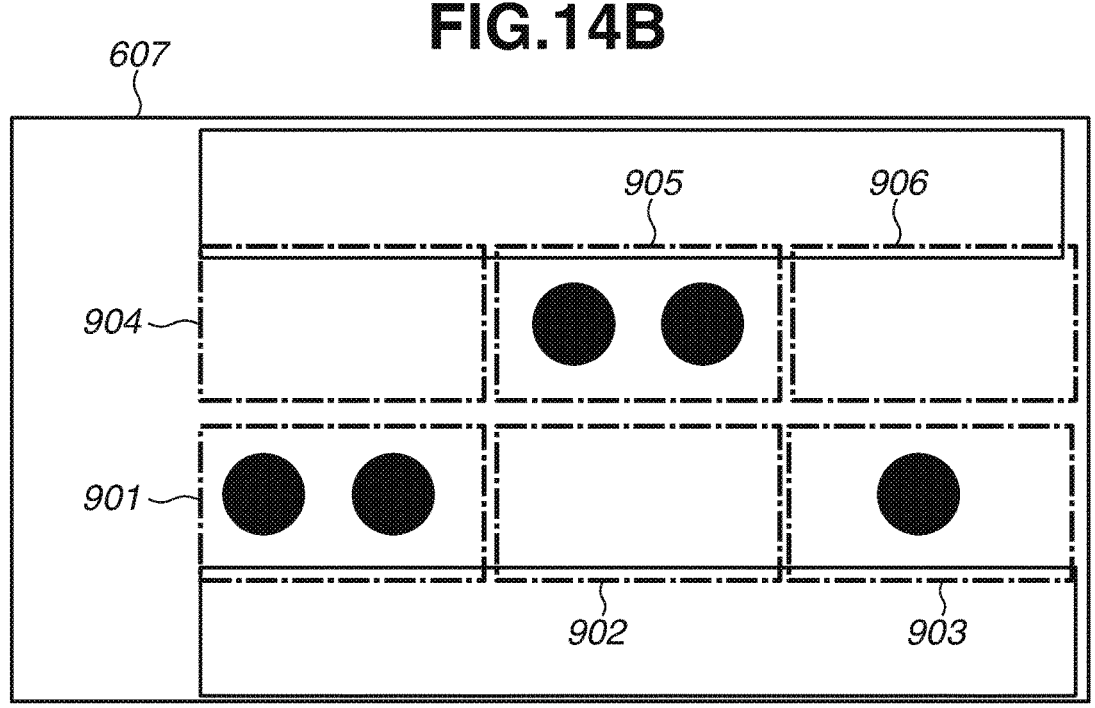

Furthermore, while a description has been made using an example in which work area frames are set in a captured image display, the control unit 121 can set work area frames in a horizontal plane image based on a user operation, as illustrated in FIG. 14B.

Here, processing for determining whether the person of interest is an isolated worker or a collaborative worker is not limited to the above-described processing. For example, the control unit 121 can be configured to associate persons with each other and determine that the associated person is a collaborative worker based on at least one of positions of persons detected from the captured image, directions of faces of the persons, and distances between the persons. For example, the control unit 121 can be configured to associate persons present within a predetermined range from a predetermined object, such as a work table, in the captured image with each other, or can be configured to estimate directions (or eye lines) of faces of persons and to associate persons the directions of faces of whom intersect with each other. Moreover, for example, the control unit 121 can be configured to associate persons the distance between whom is within a predetermined distance with each other. Then, the control unit 121 can be configured to determine that persons each of whom is associated with another person are collaborative workers and a person who is not associated with any other person is an isolated worker.

Additionally, the control unit 121 can be further configured to associate persons with each other based on colors or shapes of uniforms, bibs (vest-like clothes), or caps of persons. For example, the control unit 121 can be configured to associate persons the shapes of uniforms of whom are the same among persons the distance between whom is within a predetermined distance with each other, and not to associate persons the shapes of uniforms of whom are different even among persons the distance between whom is within a predetermined distance with each other. In this way, the control unit 121 can be configured to perform association of persons based on feature amounts of things worn by the persons.

Furthermore, even in a case where a plurality of workers is present in a work area frame, the control unit 121 can be configured to determine that each worker is an isolated worker depending on directions of faces of the workers in the work area frame or distances between the workers.

Next, in steps S1507 to S1509, the control unit 121 determines whether an isolated work is being performed, and, if that condition is satisfied, records a log indicating the isolated work and sends a notification of the log. The flow of processing is as follows.

(Processing 6). In a case where a work area frame in which an isolated work is being performed is present in (Processing 5), then in step S1507, the control unit 121 increments the cumulative number of isolated work frames, in other words, increases the value of a variable by one, and extracts a person belonging to the corresponding work area from the list. In a case where no isolated work is being performed, then in step S1508, the control unit 121 sets the cumulative number of isolated work frames to "0".

(Processing 7). If the cumulative number of isolated work frames exceeds a threshold value (YES in step S1509), the control unit 121 determines that an isolated work is being performed. Using this determination condition enables preventing, for example, erroneously notifying the user that the target worker is an isolated worker due to a momentary failure of person detection despite of being a collaborative worker.

Figures 15A, 15B:
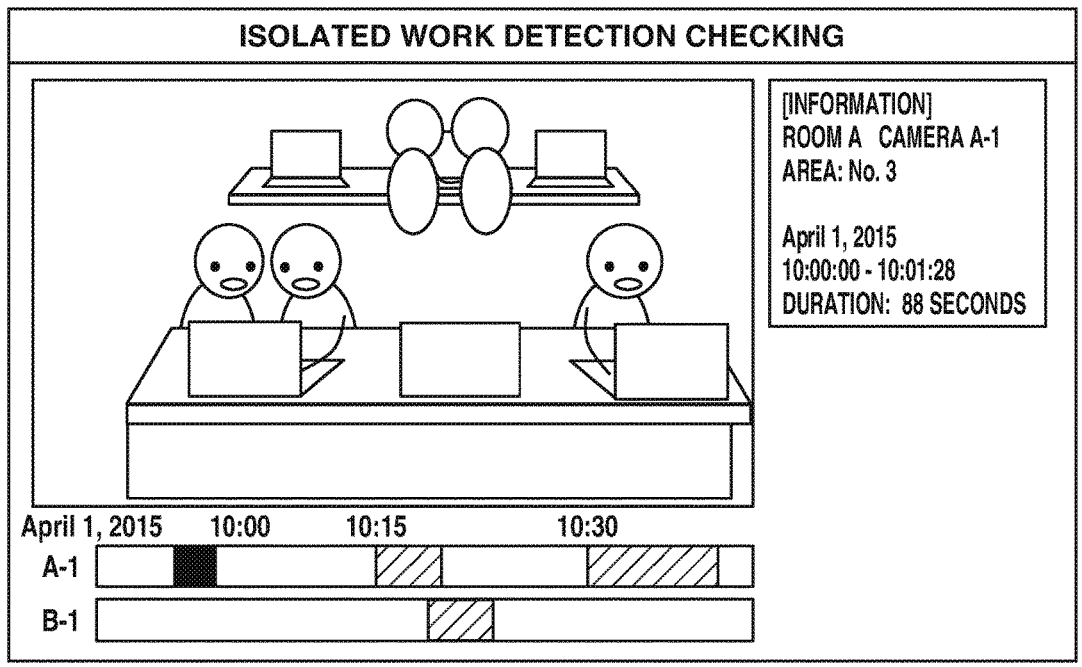
FIGS. 15A and 15B illustrate examples of display screens observed by a user.

If it is determined that an isolated work is being performed, then in step S1510, the control unit 121 displays, on the screen of the display device 140, such a notification as to indicate the clock time of occurrence of the isolated work, the duration thereof, the imaging apparatus 110 capturing an image of the isolated work, and, for example, the location at which the isolated work is being performed in the captured image. The screen illustrated in FIG. 15A is an example of a screen displaying a list of moving images captured in a time period for which an isolated work is detected. Text information written as "Isolated Work Detection List" and information on the clock time, duration, and location illustrated in FIG. 15A are an example of information distinguishably indicating a moving image in which a person who is not associated with any other person is contained. Moreover, depending on the purpose of use, moving images captured in time periods in which a person who is not associated with any other person is not contained can be displayed as a list. In that case, for example, text information written as "Collaborative Work Detection List" is displayed.

Next, in step S1511, the control unit 121 determines whether to repeat processing from acquisition of a captured image (step S200) to determination of whether to notify the user of the presence or absence of an isolated worker (steps S1509 and S1510). The control unit 121 determines to end repetitive processing in a case where the acquisition of a captured image has become impossible or in a case where an instruction for stopping the repetitive processing has been issued by the user.

While, in the display provided in step S1510, the control unit 121 is configured to display thumbnail images together with information (list) about isolated works as illustrated in FIG. 15A, the control unit 121 can display the information only in a list form. Moreover, the control unit 121 can display timelines together with display of a recorded video as illustrated in FIG. 15B, and can display an indication representing the time period of an isolated work on each timeline. A portion (a solid black portion or a shaded portion) of a timeline represented as a time period of an isolated work illustrated in FIG. 15B is an example of information distinguishably indicating a moving image in which a person who is not associated with any other person is contained. Furthermore, for example, the solid black portion represents a time period for which only one isolated worker is present, and the shaded portion represents a time period for which a plurality of isolated workers is present. Additionally, "A-1" is information indicating, for example, an ID for identifying an imaging apparatus. In the example illustrated in FIG. 15B, timelines "A-1" and "B-1" in two imaging apparatuses are illustrated.

On the other hand, a portion (a white portion) of a timeline represented as not a time period of an isolated work illustrated in FIG. 15B is an example of information distinguishably indicating a moving image in which a person who is not associated with any other person is not contained. Furthermore, the control unit 121 can display time periods of an isolated work detected by a plurality of cameras on a single timeline. As mentioned above, at least one of information distinguishably indicating that a person who is not associated with any other person is contained and information distinguishably indicating that a person who is not associated with any other person is not contained can be displayed on at least a timeline. Thus, a time period for which a person who is not associated with any other person is contained and a time period for which a person who is not associated with any other person is not contained, in a moving image, can be distinguishably indicated.

Figures 16A, 16B:
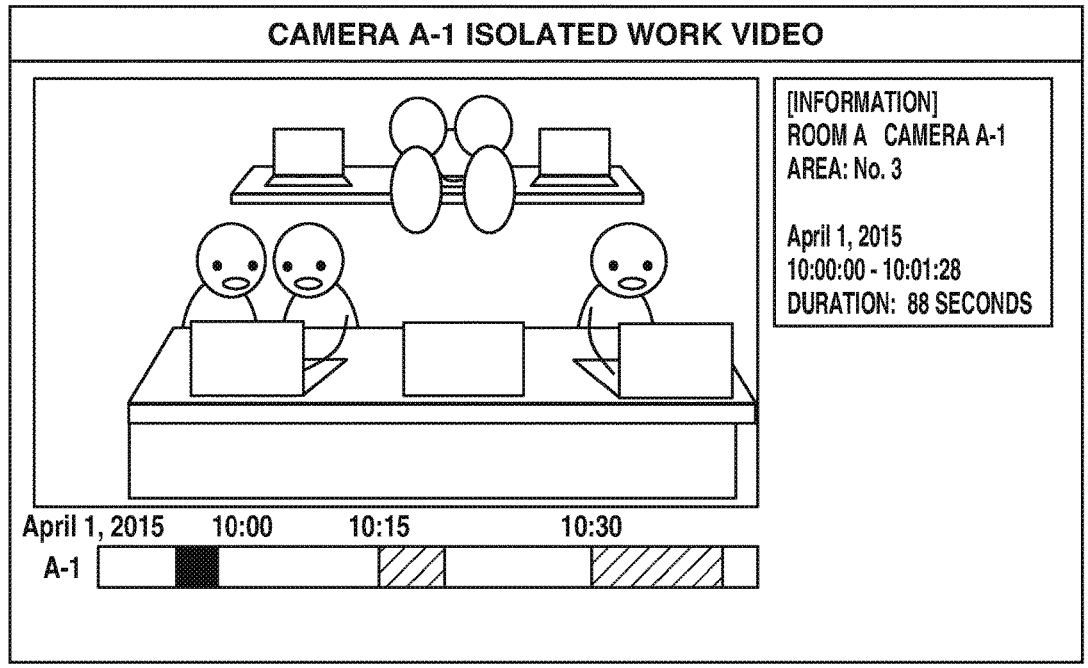
FIGS. 16A and 16B illustrate further examples of display screens observed by a user.

Furthermore, for example, the user can specify display of each isolated work with a mouse or finger, as illustrated in FIG. 16A. Then, the control unit 121 can cause the display device 140 via the display control unit 125 to play back a video recorded by the corresponding imaging apparatus to display a captured image of the played-back video, as illustrated in FIG. 16B, thus enabling checking the captured image. This can increase the user's convenience. At this time, while the control unit 121 can play back only a video recorded at the time of occurrence of an isolated work, the control unit 121 can desirably play back a video starting with a video recorded a predetermined time (for example, several tens of seconds) before the time of occurrence of an isolated work or can desirably play back a video recorded for a time longer than a duration of an isolated work, thus enabling easily checking the situations before and after the isolated work.

Moreover, the control unit 121 can join videos recorded in time periods detected as isolated works, and then can play back the joined videos as a digest video. In other words, the control unit 121 can be configured to play back moving images in the list illustrated in FIG. 16A in a continuous manner. At that time, a moving image in a time period of an isolated work in the order of several seconds can be omitted from the digest image.

While, to prevent any false detection in notification of an isolated work, a warning is issued after the isolated work continues for a predetermined time, a duration of the isolated work is a time period starting with the first detected frame. Accordingly, the control unit 121 can set the start of a time interval displayed as an isolated work in a timeline or the start of recording or playback of a video to not the time when a warning is issued but the time when an isolated work begins to be detected.

Furthermore, the control unit 121 not only displays a timeline as an isolated work time period detected in a case where a warning is issued after the cumulative number of frames in which an isolated worker is present exceeds a threshold value, but also can perform the following processing. For example, even in a case where it is determined that an isolated work is being performed for such a short period as not to cause a warning, the control unit 121 can provide a display with a color, shape, or design different from that for an isolated work time period causing a warning, thus enabling checking isolated works for both the time periods. In this case, since an isolated work that is only momentarily detected may be detected merely when, in actuality, any person of collaborative workers is temporarily hidden by a shielding object, two threshold values can be provided for determination of an isolated work. At this time, the control unit 121 issues a warning based on a threshold value that is the larger of the two threshold values. For example, with respect to information distinguishably indicating that a person who is not associated with any other person is contained, the control unit 121 uses a first threshold value, for example, 10 seconds. Then, to determine whether to issue a warning, the control unit 121 uses a second threshold value larger than the first threshold value, for example, 20 seconds.

Moreover, the control unit 121 can be configured to store, as a comma separated value (CSV) file, a list of imaging apparatuses, areas, and time information corresponding to detected isolated works, or can be configured to paste, as a report, a list with thumbnail images or screen shots of a recorded video to be ready for printing.

Additionally, in a case where, besides a captured image used for detection of an isolated work, there is provided another imaging apparatus which captures an image of a similar area at another angle or captures an image of a surrounding area, the control unit 121 can be configured to perform the following processing. For example, the control unit 121 can display a video captured and recorded by an imaging apparatus on which the setting of association has been performed in advance.

Figure 17A:
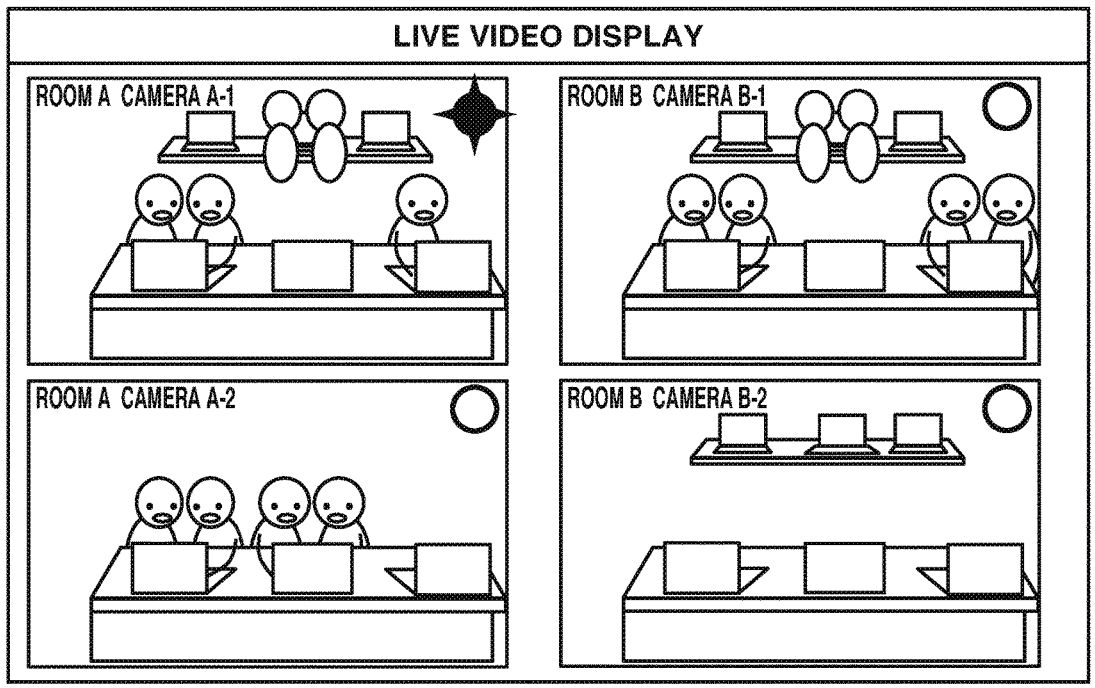
FIGS. 17A and 17B illustrate examples of display screens.

In addition, in the case of a system which detects an isolated work using live videos and, when determining that the isolated work is being performed, issues a warning in real time, as illustrated in FIG. 17A, the work observer needs to not only check the current situation but also check the past situation. Therefore, the control unit 121 can perform control to display both a live video and a recorded video. Referring to FIG. 17A, in a video showing a room A, changing an index located at the upper right corner corresponds to displaying information distinguishably indicating that a person who is not associated with any other person is contained.

Figure 17B:
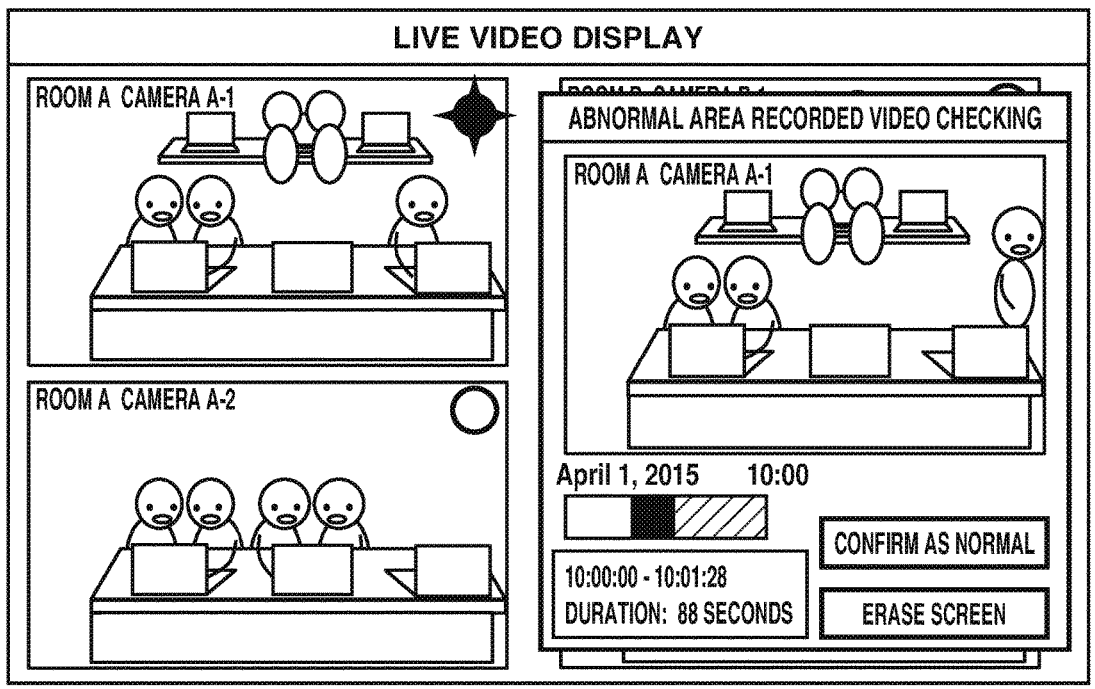

The control unit 121 can be configured to erase, from a series of displayed images, for example, an image determined and selected by the work observer to be free from any false notification, as illustrated in FIG. 17B.

In the present exemplary embodiment, a description has been made using an example in which the control unit 121 sets work area frames. The control unit 121 can be configured to, when detecting an isolated work, cause the display device 140 to display a work area frame in which the isolated work is detected in superimposition on a video. Furthermore, the control unit 121 can previously display all work area frames in superimposition on a video and, when an isolated work is performed, display a work area frame in which the isolated work is performed in such an explicit or highlighted manner as to change the color of the work area frame to a color different from those of the other work area frames or to perform blinking display. This enables the work observer to understand, with good visibility, whether a person shown in a video is isolated from or associated with another person.

Furthermore, while, in the present exemplary embodiment, an example has been described in which a single client apparatus detects, for example, persons and displays the persons, a plurality of client apparatuses can perform such processing. For example, processing can be performed by a first client apparatus, which receives a video, detects, for example, an isolated worker, and sends a notification thereof, and a second client apparatus, which receives the notification to output an alarm or to perform list display or timeline display. An example of the first client apparatus is a video content analysis (VCA) apparatus. An example of the second client apparatus is a video management system (VMS) apparatus. The hardware configuration of the first client apparatus and the second client apparatus is similar to that of the client apparatus 120 illustrated in FIG. 1. The functions of the respective client apparatuses are implemented by the CPUs of the respective client apparatuses performing processing based on programs stored in memories of the respective client apparatuses.

Figure 18A:
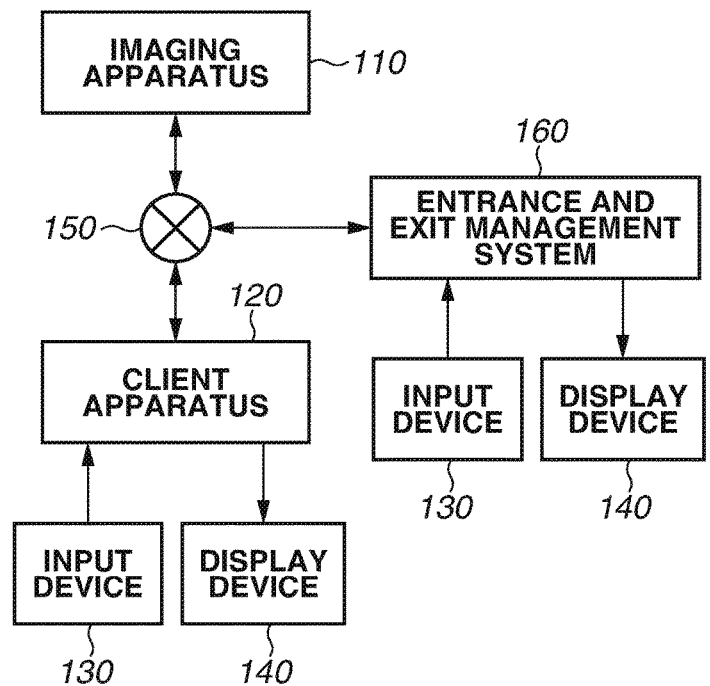
FIGS. 18A and 18B illustrate examples of cooperation with an entrance and exit management system.
Figure 18B:
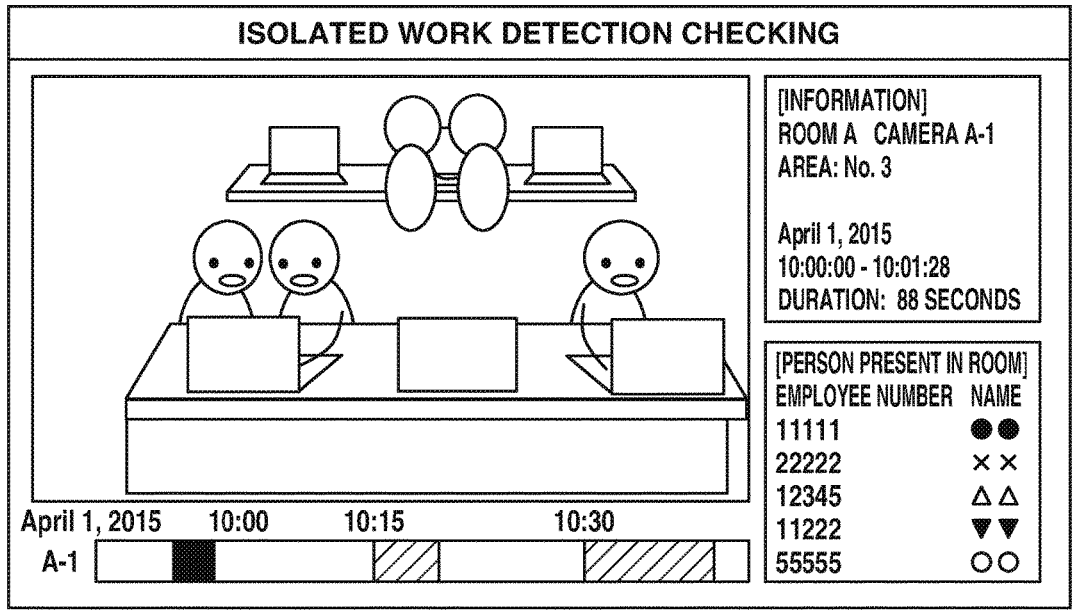

FIG. 18A illustrates an example of a case where the system according to the present exemplary embodiment and an entrance and exit management system 160 cooperate with each other. The entrance and exit management system 160 records the clock times at which workers enter and exit a workroom. Accordingly, as illustrated in FIG. 18B, the control unit 121 acquires information on the clock times at which each worker enters and exits the workroom from the entrance and exit management system 160, and extracts workers who are present in the workroom from the acquired information. Then, the control unit 121 can be configured to record a list of names of the extracted workers as a part of information indicating a list of occurrences of an isolated work or to display such a list on a screen. However, this is not limiting, but the control unit 121 can send an e-mail to the user. This recording or displaying can be implemented by the system according to the present exemplary embodiment, or can be incorporated into, for example, the entrance and exit management system 160. The list of names of the extracted workers is an example of entrance and exit information.

Figure 19:
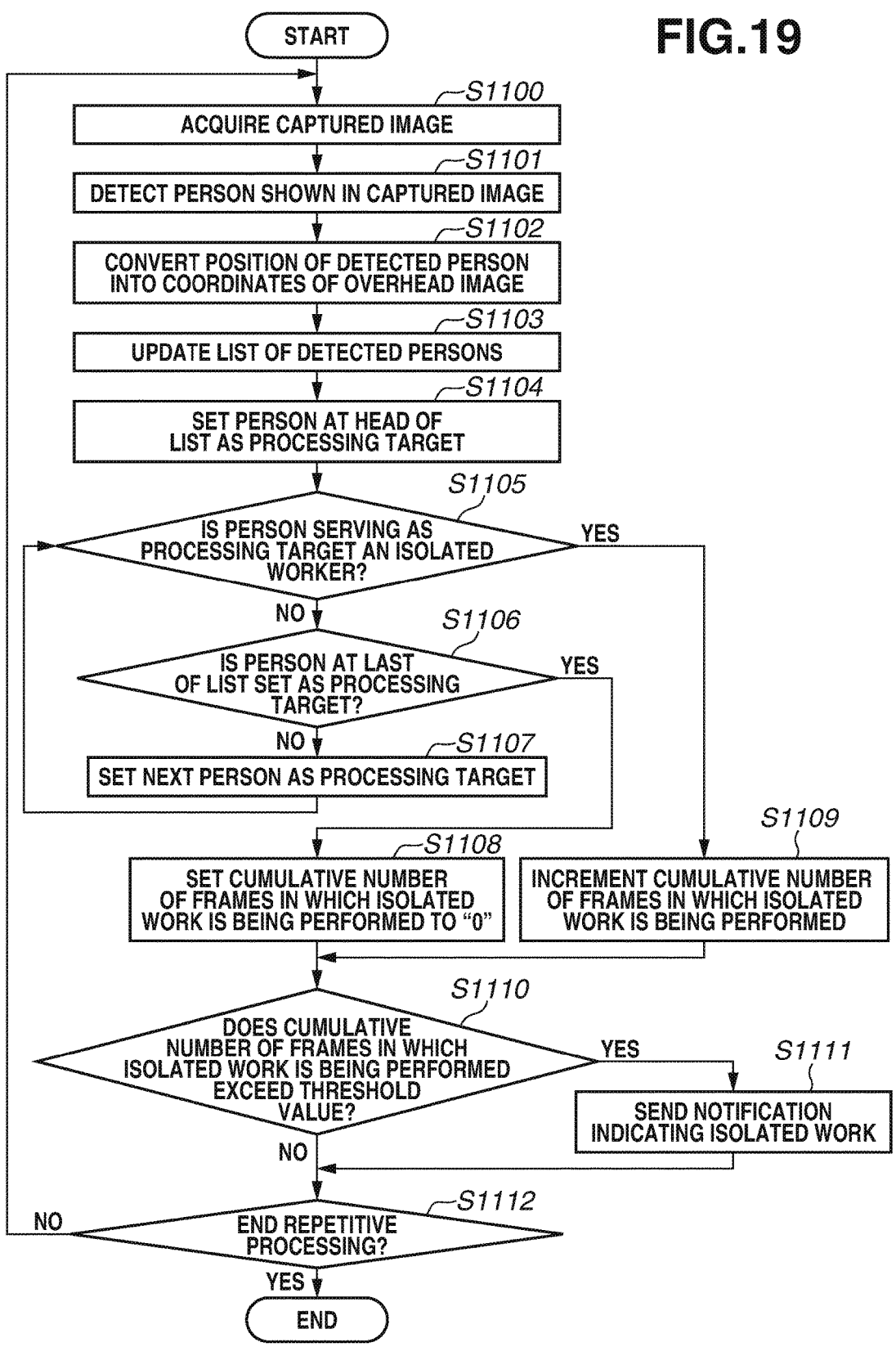
FIG. 19 is a flowchart illustrating an example of processing for notification control.

A fifth exemplary embodiment is the same as the other exemplary embodiments in a part of the configuration thereof. In the present exemplary embodiment, a description is made using an example in which a determination of whether an isolated worker is present is made not based on detection using a work area frame but based on distances. The flow of processing in the present exemplary embodiment is described with reference to FIG. 19. Moreover, elements or steps similar to those of the other exemplary embodiments are omitted from the description, and elements or steps different from those of the other exemplary embodiments are mainly described.

Processing performed from the time when the control unit 121 acquires a captured image from the imaging apparatus 110 (step S1101) to the time when the control unit 121 updates a list of detected persons (step S1103) is similar to the processing described in the first exemplary embodiment.

Next, in steps S1104 to S1106, the control unit 121 determines whether an isolated worker is present in the captured image. The flow of processing is as follows.

(Processing 1). In step S1104, the control unit 121 sets the head of the list as a processing target.

(Processing 2). In step S1105, the control unit 121 determines whether a person serving as a processing target is an isolated worker. In the present exemplary embodiment, the control unit 121 checks the following items with respect to the person serving as a processing target so as to determine whether that person is an isolated worker.

(Item 1). The control unit 121 sets the coordinates on the horizontal plane image of the person serving as a processing target as the center, and determines whether a detected person is present within the radius R from the center.

The radius R can be set as appropriate according to a situation to which the present exemplary embodiment is applied. For example, in the case of observing an indoor work, the radius R can be set to a distance corresponding to 2 m. However, at this time, the control unit 121 refers to a history of coordinates stored in the node of the person serving as a processing target, and sets the value of the radius R, which is a threshold value, larger when determining that the person serving as a processing target is in motion than when determining that the person serving as a processing target is not in motion. Furthermore, at this time, if collaborative workers are working side by side along the x-axis direction on the horizontal plane image, the control unit 121 can use an ellipse obtained by shortening a circle with the radius R in the y-axis direction. Similarly, if collaborative workers are working side by side along the y-axis direction on the horizontal plane image, the control unit 121 can use an ellipse obtained by shortening a circle with the radius R in the x-axis direction.

(Item 2). In a case where a person satisfying (Item 1) is present, the control unit 121 determines whether that person is present in a detection area (work area frame).

In the present exemplary embodiment, the control unit 121 sets an area specified by the user operating, for example, the input device 130 as a detection area, in which a person is present. This enables preventing, for example, a non-worker who is moving on the opposite side of a glass-made wall or a person shown on, for example, a poster placed on a desk from being erroneously detected as a collaborative worker. However, setting of the detection area is not limited to inputting by the user via, for example, the input device 130. The control unit 121 can automatically set an area surrounded with a marker laid on the captured image as a detection area. The method for detection using a marker includes, for example, performing pattern matching between two-dimensional markers set at the four corners of a detection area and information on the above two-dimensional markers previously registered with the client apparatus 120 by performing raster scanning on the captured image.

In a case where all of the above-mentioned (Item 1) and (Item 2) are satisfied, the control unit 121 determines that the person serving as a processing target is a collaborative worker (NO in step S1105), and then proceeds to (Processing 3-1) (S1106). In other words, the control unit 121 associates workers satisfying all of the above-mentioned (Item 1) and (Item 2) with each other and determines that the workers are collaborative workers. Moreover, in a case where at least one of the above-mentioned (Item 1) and (Item 2) is not satisfied, the control unit 121 determines that the person serving as a processing target is an isolated worker (YES in step S1105), and then proceeds to (Processing 3-2) (step S1109).

Here, processing for determining whether the person serving as a processing target is an isolated worker or a collaborative worker is not limited to the above-described processing. For example, the control unit 121 can be configured to associate persons with each other based on at least one of positions of persons detected from the captured image, directions of faces of the persons, and distances between the persons. For example, the control unit 121 can be configured to associate persons present within a predetermined range from a predetermined object, such as a work table, in the captured image with each other, or can be configured to estimate directions (or eye lines) of faces of persons and to associate persons the directions of faces of whom intersect with each other. Moreover, for example, the control unit 121 can be configured to associate persons the distance between whom is within a predetermined distance with each other. Then, the control unit 121 can be configured to determine that persons each of whom is associated with another person are collaborative workers and a person who is not associated with any other person is an isolated worker. Additionally, the control unit 121 can be further configured to associate persons with each other based on colors or shapes of uniforms, bibs (vest-like clothes), or caps of persons. For example, the control unit 121 can be configured to associate persons the shapes of uniforms of whom are the same among persons the distance between whom is within a predetermined distance with each other, and not to associate persons the shapes of uniforms of whom are different even among persons the distance between whom is within a predetermined distance with each other, or can make a determination based on a plurality of conditions in such a manner that persons the distance between whom is within a predetermined distance and the colors of bibs of whom are different are collaborative workers in combination and the other persons are isolated workers.

Figure 20:
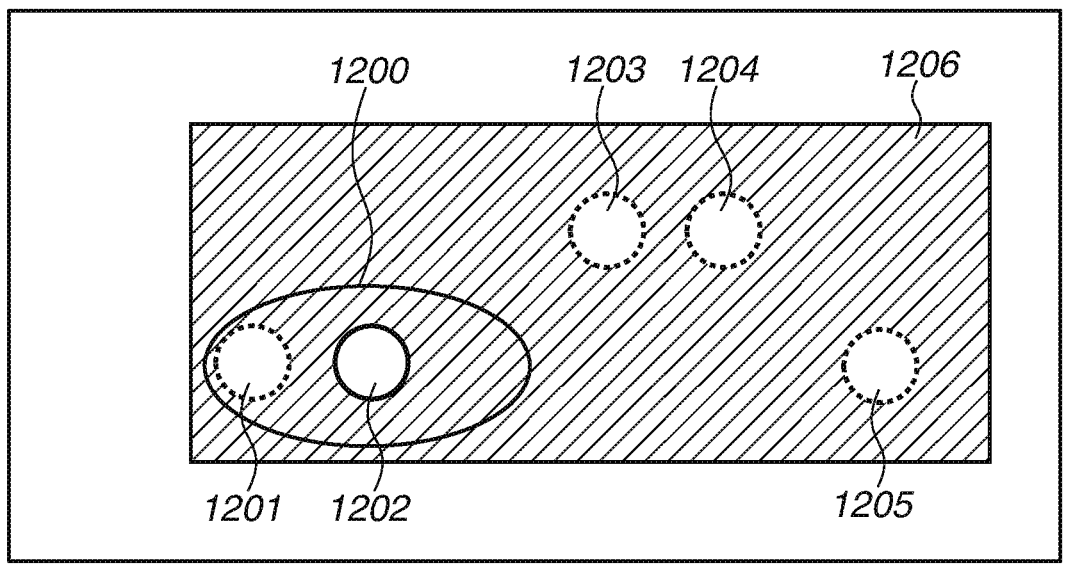
FIG. 20 illustrates an example of determination.

The determinations in the above-mentioned (Item 1) and (Item 2) are described with reference to FIG. 20. In FIG. 20, ellipses 1201 to 1205 represent results of converting the centers of the ellipses 401 to 405, which are person detection positions, into coordinates on the horizontal plane image. Moreover, a region 1206 represents a detection area specified by the user. Additionally, an ellipse 1200 represents an ellipse defined by points x and y satisfying the above-mentioned formula (4).

In the above-mentioned formula (4), qx and qy denote the x coordinate and y coordinate, respectively, on the horizontal plane image of a person serving as a processing target. In FIG. 20, qx and qy represent the x coordinate and y coordinate, respectively, of the ellipse 1202. In formula (4), a and b denote transformation parameters for an ellipse. For example, when a=1 and b=1, the ellipse becomes a circle with a radius of R and a center of (qx, qy). Moreover, when a=1 and b=½, the ellipse becomes an ellipse with a length of R in the x-axis direction and a length of R/2 in the y-axis direction. In the present exemplary embodiment, since collaborative workers are working side by side along the x-axis direction on the horizontal plane image, the values of the transformation parameters are set to a relationship of "a>b".

For example, suppose that the control unit 121 sets a person in the ellipse 402, which is a person detection position, as a processing target during scanning of the list. At this time, the control unit 121 performs determinations in the above-mentioned (Item 1) and (Item 2) with respect to the ellipse 1202 on the horizontal plane image corresponding to the ellipse 402, which is a person detection position. First, in (Item 1), the control unit 121 determines whether a detected person is present inside the ellipse 1200. In the situation illustrated in FIG. 20, since the coordinates of the ellipse 1201 on the horizontal plane image corresponding to the ellipse 401 for person detection are included in the ellipse 1200, the control unit 121 determines that the required condition is satisfied. Next, in (Item 2), the control unit 121 determines whether the coordinates of the ellipse 1201 on the horizontal plane image corresponding to the ellipse 401 for person detection causing satisfaction of the required condition of (Item 1) are included in the region 1206. In the situation described in the present exemplary embodiment, since the coordinates of the ellipse 1201 are included in the region 1206, the control unit 121 determines that the required condition is satisfied. Thus, since all of the requirements in (Item 1) and (Item 2) are satisfied, the control unit 121 determines that the person in the ellipse 402 is a collaborative worker.

(Processing 3-1). In step S1106, the control unit 121 determines whether the last of the list is set as a processing target. If the processing target is not the last of the list (NO in step S1106), then in step S1107, the control unit 121 sets a next person as a processing target, and then returns to (Processing 2). If the processing target is the last of the list (YES in step S1106), the control unit 121 ends scanning on the list, and then in step S1108, sets the cumulative number of frames in which an isolated worker is present to "0".

(Processing 3-2). In step S1109, the control unit 121 increments the cumulative number of frames in which an isolated worker is present.

Next, in steps S1110 and S1111, the control unit 121 determines whether to notify the user that an isolated worker is present, and, if that condition is satisfied, sends a notification to that effect.

With regard to, for example, display processing in issuing the notification, the control unit 121 performs processing similar to that in the first exemplary embodiment.

Furthermore, in the present exemplary embodiment, as a method for notifying the user that an isolated worker is present, the control unit 121 displays, on the display device 140, a user interface (UI) indicating that an isolated worker is present. For example, the control unit 121 superimposes a double-line circle or superimposes a red circle at the position of an isolated worker on the captured image 300 or the horizontal plane image 500. However, this is not limiting, but the control unit 121 can, for example, send an e-mail to the user or can output a signal to an output terminal to issue an alert from a speaker. Next, in step S1112, the control unit 121 determines whether to repeat processing from acquisition of a captured image (step S1100). For example, the control unit 121 determines to end repetitive processing in a case where the acquisition of a captured image from the imaging apparatus 110 has become impossible or in a case where an instruction for stopping the repetitive processing has been issued by the user.

Thus, according to the above-described fourth and fifth exemplary embodiments, information indicating whether an isolated person is present or a plurality of collaborative persons is present in an image can be appropriately presented. When receiving a notification indicating that an isolated worker is present at a work site, the work observer can readily check a video showing the isolated worker and thus can find a worker breaking a rule and call attention to the worker.

The present invention can also be implemented by supplying a program having one or more functions of the above-described exemplary embodiments to a system or an apparatus via a network or a storage medium. Then, one or more processors included in a computer of the system or the apparatus can read and execute the program. Moreover, the present invention can also be implemented by a circuit capable of implementing one or more functions (for example, application specific integrated circuits (ASIC)).

While exemplary embodiments of the present invention have been described in detail above, the present invention is not limited to such specific exemplary embodiments. The functional configuration of the imaging apparatus 110 can also be implemented in the imaging apparatus 110 as a software configuration that is implemented by the CPU 12 performing processing based on a program stored in the memory 13. Furthermore, a part or all of the functional configuration of the imaging apparatus 110 can also be implemented in the imaging apparatus 110 as a hardware configuration. Similarly, the functional configuration of the client apparatus 120 can also be implemented in the client apparatus 120 by the CPU 22 performing processing based on a program stored in the memory 21. Additionally, a part or all of the functional configuration of the client apparatus 120 can also be implemented in the client apparatus 120 as a hardware configuration.

Furthermore, images of patterns to be superimposed on persons can be selected in any combination. More specifically, a collaborative worker and an isolated worker can be discriminated using respective different colors as well as using a solid-line ellipse and a double-line ellipse, and character strings indicating, for example, an isolated worker and a collaborative worker can be additionally displayed.

Moreover, the above-described hardware configuration of the client apparatus or the imaging apparatus is merely an example, and, for example, can include a plurality of CPUs, a plurality of memories, or a plurality of communication I/Fs.

According to the above-described exemplary embodiments, for example, information indicating whether an isolated person is present or a plurality of collaborative persons is present in an image can be appropriately presented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-214925 filed Oct. 30, 2015, No. 2015-214935 filed Oct. 30, 2015, and No. 2015-215053 filed Oct. 30, 2015, which are hereby incorporated by reference herein in their entirety.

What is claimed is:

1. A control apparatus comprising:
circuitry configured to perform operations including:
detecting each person included in an image which includes a plurality of persons,
associating, as an association step, each detected person with another person included the image in a case where at least one of positions of the detected person and the another person, directions of faces of the detected person and the another person, or distances between the detected person and the another person meet a predetermined criteria,
causing a display device to perform display processing to select, as an associated person, one person associated in the association step, to determine, as a not associated person, a person included in the image who is not associated with any other person included in the image, and to distinguish between the associated person and the not associated person, and
causing a notification device to perform notification processing in a case where it is determined that a period of time in which the distinguished not associated person is contained in the image exceeds a threshold value.

2. The control apparatus according to claim 1, wherein the display processing to distinguish includes altering the image to distinguish between the associated person and the not associated person using at least one of the following: a difference in type of a line, a difference in color of a line, a difference in type of a graphic, a difference in numerical value, or superimposing a difference in character string on each person included in the image.

3. The control apparatus according to claim 1,
wherein the circuitry further is configured to perform operations including acquiring the image from an imaging apparatus, and
wherein detecting includes detecting a person included in the acquired image.

4. The control apparatus according to claim 1,
wherein the image is a moving image,
wherein the notification device includes a display device, and
wherein causing the notification device to perform notification processing includes causing the display device to perform display processing according a period of time in which the not associated person is contained in the moving image.

5. The control apparatus according to claim 1,
wherein the image is a moving image,
wherein the display processing includes superimposing an object on the not associated person indicating that the not associated person is the not associated person included in the moving image.

6. The control apparatus according to claim 1, wherein the circuitry further is configured to perform operations including causing the display device to display at least one of the following: information indicating that the not associated person is contained in the image or information indicating that the not associated person is not contained in the image.

7. The control apparatus according to claim 6, wherein the information distinguishably indicating that the not associated person is contained in the image is information indicating, on a timeline, a time period for which the not associated person is contained in the image.

8. The control apparatus according to claim 6, wherein the information distinguishably indicating that the not associated person is not contained in the image is information indicating, on a timeline, a time period for which the not associated person is not contained in the image.

9. The control apparatus according to claim 6,
wherein the image is a moving image,
wherein the information distinguishably indicating that the not associated person included in the moving image is contained in the moving image is at least one of the following: information indicating clock time of the moving image in which the not associated person is contained, information indicating a duration of the moving image, or information indicating a location of the not associated person contained in the moving image.

10. The control apparatus according to claim 6, wherein the circuitry further is configured to perform operations including:
acquiring entrance and exit information on the not associated person from an entrance and exit management system, and
causing the display device to further display the acquired entrance and exit information.

11. The control apparatus according to claim 1, wherein the circuitry further is configured to perform operations including:
acquiring an image from an imaging apparatus, and
detecting a person in the acquired image.

12. The control apparatus according to claim 1, wherein the circuitry further is configured to perform operations including detecting a first person included in the image based on a feature amount of the first person included in the image.

13. The control apparatus according to claim 1, wherein the circuitry further is configured to perform operations including associating plural persons included in the image with each other based on a feature amount of a thing worn by each of the plural persons included in the image.

14. The control apparatus according to claim 13, wherein the thing worn by each of the plural persons included in the image is at least one of the following: a uniform, a bib, or a cap.

15. The control apparatus according to claim 1, further comprising displaying, on the display device, a determination notification from the notification processing configured to allow a user to determine that the not associated person is not associated with any other person included in the image.

16. The control apparatus according to claim 15, wherein the displayed determination notification is configured by the notification processing to allow the user to determine that the not associated person is working either independently or in isolation from other persons included in the image.

17. The control apparatus according to claim 1,
wherein a configured notification notified by the notification processing is configured to allow a user to determined that the not associated person is working in a way that is in violation of a work rule related to working independently, and
wherein the notification processing causes the configured notification to appear on the display device.

18. The control apparatus according to claim 1,
wherein a configured notification notified by the notification processing is configured to allow a user to determined that the not associated person is working in a way that in compliance with a work rule related to working independently, and wherein the notification processing causes the configured notification to appear on the display device.

19. The control apparatus according to claim 1, wherein causing the display device to perform display processing incudes causing the display device to perform display processing to alter the image in a manner that distinguishes between the associated person and the not associated person.

20. A method for a control apparatus, the method comprising:

detecting each person included in an image which includes a plurality of persons;

associating, as an association step, each detected person with another person included the image in a case where at least one of positions of the detected person and the another person, directions of faces of the detected person and the another person, or distances between the detected person and the another person meet a predetermined criteria;

causing a display device to perform display processing to select, as an associated person, one person associated in the association step, to determine, as a not associated person, a person included in the image who is not associated with any other person included in the image, and to distinguish between the associated person and the not associated person; and causing a notification device to perform notification processing in a case where it is determined that a period of time in which the distinguished not associated person is contained in the image exceeds a threshold value.

21. A non-transitory computer-readable storage medium storing a program to cause a computer to perform a method for a control apparatus, the method comprising:

detecting each person included in an image which includes a plurality of persons;

associating, as an association step, each detected person with another person included the image in a case where at least one of positions of the detected person and the another person, directions of faces of the detected person and the another person, or distances between the detected person and the another person meet a predetermined criteria;

causing a display device to perform display processing to select, as an associated person, one person associated in the association step, to determine, as a not associated person, a person included in the image who is not associated with any other person included in the image, and to distinguish between the associated person and the not associated person; and causing a notification device to perform notification processing in a case where it is determined that a period of time in which the distinguished not associated person is contained in the image exceeds a threshold value.

* * * * *